US012486692B2

(12) United States Patent
Lin

(10) Patent No.: US 12,486,692 B2
(45) Date of Patent: Dec. 2, 2025

(54) ROTARY LOCKED STRUCTURE OF DOOR LOCK

(71) Applicant: TAIWAN FU HSING INDUSTRIAL CO., LTD., Kaohsiung (TW)

(72) Inventor: Yu-Cheng Lin, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 538 days.

(21) Appl. No.: 17/816,514

(22) Filed: Aug. 1, 2022

(65) Prior Publication Data

US 2023/0079724 A1 Mar. 16, 2023

(30) Foreign Application Priority Data

Sep. 14, 2021 (TW) ................................ 110134260

(51) Int. Cl.
*E05B 17/00* (2006.01)
*E05B 9/08* (2006.01)

(52) U.S. Cl.
CPC ............ *E05B 17/0012* (2013.01); *E05B 9/08* (2013.01)

(58) Field of Classification Search
CPC ... Y10T 292/82; Y10T 292/85; Y10T 292/93; E05B 1/00; E05B 3/003; E05B 3/02; E05B 3/04; E05B 3/08; E05B 2009/046; E05B 13/002; E05B 13/004; E05B 13/10; E05B 13/101; E05B 13/106; E05B 13/108; E05B 15/0013; E05B 15/0033
See application file for complete search history.

(56) References Cited

U.S. PATENT DOCUMENTS

| | | | | |
|---|---|---|---|---|
| 9,121,200 | B2 * | 9/2015 | Weathersby | E05B 65/06 |
| 9,371,671 | B2 * | 6/2016 | Weathersby | E05C 1/163 |
| 2009/0056392 | A1 * | 3/2009 | Brannaman | E05B 17/005 70/91 |
| 2016/0340931 | A1 * | 11/2016 | Huang | E05B 13/101 |
| 2018/0328077 | A1 * | 11/2018 | Huang | E05C 9/1841 |
| 2019/0376313 | A1 * | 12/2019 | Barker | E05C 1/163 |

* cited by examiner

*Primary Examiner* — Christine M Mills
*Assistant Examiner* — Yahya Sidky
(74) *Attorney, Agent, or Firm* — Rosenberg, Klein & Lee

(57) ABSTRACT

A rotary locked structure of a door lock includes a tubular driving part and connected to a first knob. The driving part includes a restriction portion. An inner tube is received in the driving part and has a positioning portion located corresponding to the restriction portion to restrict rotational movement of the inner tube in the driving part. A restriction unit is formed axially in the inner periphery of the inner tube. A shaft includes a connection portion that includes a positioning unit located corresponding to the restriction unit to restrict rotational movement of the shaft in the inner tube. The driving part, the inner tube and the shaft are pre-assembled in factories. The inner tube and the shaft are not limited to be engaged in only one direction. The spindle and driving column can be directly connected to the inner tube and the shaft without rotating the inner tube and shaft.

17 Claims, 27 Drawing Sheets

ROTARY LOCKED STRUCTURE OF DOOR LOCK

BACKGROUND OF THE INVENTION

1. Fields of the Invention

The present invention relates to a rotary locked structure, and more particularly, to a rotary locked structure of a door lock for convenient installation of the door lock.

2. Descriptions of Related Art

Doors are necessary parts for a building, and the doors can be opened and closed for users to enter and exit. There are many types of doors with different materials, sizes and thicknesses due to different usage requirements, and at least one lock is needed to the door to have the effect of door opening, closing and anti-theft.

The conventional door locks generally include an inside knob and an outside knob, because they are more convenient to use and install. They are usually installed and used to homes and offices. Generally speaking, there is a drive shaft connected to the inside knob, and a turning piece is installed to the inside knob and connected to the drive shaft so as to operate the drive shaft to lock the door lock. The outside knob is equipped with a lock cylinder which is unlocked by using a correct key, as disclosed in U.S. Pat. No. 6,598,440. The drive shaft is installed to the inside tube of the inside knob in the factory, and the inside knob can be freely rotated and does not have a proper restriction structure. When installing the inside knob and the outside knob, the drive shaft and the inside tube have to rotated to align the inside tube with the spindle connected to the outside knob, so that the inside knob and the outside knob are mechanically connected to each other. However, it takes time to align the inside tube and the spindle. The inside tube has to be installed in only one direction, so that try and error repeatedly is required when installing the door lock.

Since the thickness of most doors is between 32 mm and 60 mm, when the door is a thinner one, the spring mounted to the drive shaft will be greatly compressed, resulting in an increase in the resistance to the rotation of the rotating shaft, which generates a significant resistance when rotating the drive shaft due to a greater torque has to be applied to rotate the drive shaft. Therefore, the operability is poor for locking and unlocking of the door lock.

The present invention intends to provide a rotary locked structure of a door lock for convenient installation of a door lock to eliminate shortcomings mentioned above.

SUMMARY OF THE INVENTION

The present invention relates to a rotary locked structure of a door lock, and comprises a driving part which is tubular part and connected to a first knob of the lock. The driving part includes at least one restriction portion formed to the inner periphery thereof. An inner tube is received in the driving part and has a positioning portion located corresponding to the at least one restriction portion so as to restrict rotational movement of the inner tube in the driving part. The inner tube is movable within the driving part axially. At least one restriction unit is formed axially in the inner periphery of the inner tube. A shaft has a connection portion formed to one of two ends thereof. The connection portion includes a positioning unit located corresponding to the at least one restriction unit so as to restrict rotational movement of the shaft in the inner tube. The inner tube is axially movable relative to the positioning unit of the shaft.

Preferably, the positioning portion and the at least one restriction portion are two correspondent planes, a notch and a protrusion, or a sliding block and a groove.

Preferably, the at least one restriction unit and the positioning unit are two planes that are located corresponding to each other.

Preferably, the inner tube includes two blocks which are radially mounted to an outer periphery of the connection portion.

Preferably, the at least one restriction unit includes a hook formed to an inner periphery of each block. The positioning unit of the connection portion includes two axial grooves formed to the outer periphery of the connection portion. The two hooks of the two blocks are engaged with the two axial grooves.

Preferably, the blocks each have a push part extending from the inner periphery thereof. The connection portion includes a hole formed to a distal end thereof. Two passages are defined in the outer periphery of the connection portion and communicate with the hole. The two push parts extend through the two passages and reach the hole.

Preferably, a first spring biases one end of the inner tube so as to push the inner tube toward the driving part.

Preferably, the at least one restriction unit includes at least one guide portion formed to each of the blocks. The positioning unit includes two slide units formed to the connection portion. The slide units are located corresponding to the at least one guide portion of each of the blocks. When the blocks move toward the first knob, the blocks move outward and radially relative to the slide units to form a path between the two blocks.

Preferably, the at least one guide portion of each of the blocks and the slide units are correspondent channels and protrusions. Each channel includes a straight section and an inclined section. The straight section is defined axially in the connection portion, and the inclined section extends outward and radially.

The present invention provides a lock that comprises a first knob pivotably connected to a first rosette and drives a driving part. The driving part is a tubular part and has at least one restriction portion formed to the inner periphery thereof. An inner tube is received in the driving part and has a positioning portion located corresponding to the at least one restriction portion so as to restrict rotational movement of the inner tube in the driving part. The inner tube is movable within the driving part axially. At least one restriction unit is formed axially in the inner periphery of the inner tube. A shaft has a connection portion formed to one of two ends thereof. The connection portion includes a positioning unit located corresponding to the at least one restriction unit so as to restrict rotational movement of the shaft in the inner tube. The inner tube is axially movable relative to the positioning unit of the shaft. A first spring is located between the shaft and the inner tube.

Preferably, a second knob is located opposite to the first knob. The second knob includes a driving column and a spindle. One of the driving column and the spindle contacts the inner end of the inner tube, and the spindle is connected to the shaft.

Preferably, the second knob is pivotably connected to a second rosette and drives a sleeve. The sleeve includes a transmission unit which includes the driving column that is mounted to outside of the spindle. The driving part includes a driving ring which is connected to the driving column. The second knob includes a lock cylinder which is connected to the spindle. The second rosette includes a mounting plate received therein that has at least one notch. The spindle includes a lug extending radially therefrom. A lock ring is mounted to the spindle and connected to the sleeve. The lock ring includes at least one tongue extending radially therefrom and protruding beyond the sleeve and located corresponding to the at least one notch. The lock ring includes a first recess and a second recess located corresponding to the lug. A stop is formed to an inner side of the sleeve. A second spring is located between the stop and the lock ring. When in a locked status, the spindle is rotated to locate the lug in the first recess, such that the lock ring compresses the second spring, and the at least one tongue is engaged with the at least one notch. When in an unlock status, the spindle is rotated to locate the lug in the second recess, the second spring expands and axially contacts the lock ring, such that the lug is engaged with the second recess, and the at least one tongue is disengaged from the at least one notch.

Preferably, the positioning portion and the at least one restriction portion are two correspondent planes, a notch and a protrusion, or a sliding block and a groove.

Preferably, the at least one restriction unit and the positioning unit are two planes that are located corresponding to each other.

Preferably, the inner tube includes two blocks which are radially mounted to an outer periphery of the connection portion.

Preferably, the at least one restriction unit includes a hook formed to an inner periphery of each block. The positioning unit of the connection portion includes two axial grooves formed to the outer periphery of the connection portion. The two hooks of the two blocks are engaged with the two axial grooves.

Preferably, the blocks each have a push part extending from the inner periphery thereof. The connection portion includes a hole formed to a distal end thereof. Two passages are defined in the outer periphery of the connection portion and communicate with the hole. The two push parts extend through the two passages and reach the hole.

Preferably, the at least one restriction unit includes at least one guide portion formed to each of the blocks. The positioning unit includes two slide units formed to the connection portion. The slide units are located corresponding to the at least one guide portion of each of the blocks. When the blocks move toward the first spring, the blocks move outward and radially relative to the slide units to form a path between the two blocks.

Preferably, the at least one guide portion of each of the blocks and the slide units are correspondent channels and protrusions. Each channel includes a straight section and an inclined section. The straight section is defined axially in the connection portion, and the inclined section extends outward and radially.

The advantages of the present invention are that the driving part, the inner tube and the shaft are pre-assembled in factories. The users may install the lock easily and conveniently. The inner tube and the shaft are pre-assembled so that they cannot rotated relative to each other. The spindle and driving column that are connected to the outside knob can be directly connected to the inner tube and the shaft without rotating the inner tube and shaft for alignment. Furthermore, the positioning portion/unit and the restriction portion/unit can be designed to locate at multiple correspondent planes, so that the shaft, inner tube and the driving part can be installed to multiple planes by slightly rotation. The manufacturers simply assembled the driving part, the inner tube and the shaft, which are positioned as one piece in the rotational direction, to easily connect these parts to the spindle and driving column that are connected to the outside knob. The blocks are modularized and save material when being manufactured, so as to reduce the cost for manufacturing the inner tube. The hooks of the blocks allow the blocks to be directly installed to the connection portion of the shaft. Preferably, by the slide unit and the guide portion, the blocks move toward the connection portion when assembled, the blocks move outward and radially relative to the shaft so that the resilient force of the first spring in axial direction can be dispersed such that when the lock is installed to a thin door, the recovery force is reduced, such that the shaft can be rotated easily and smoothly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
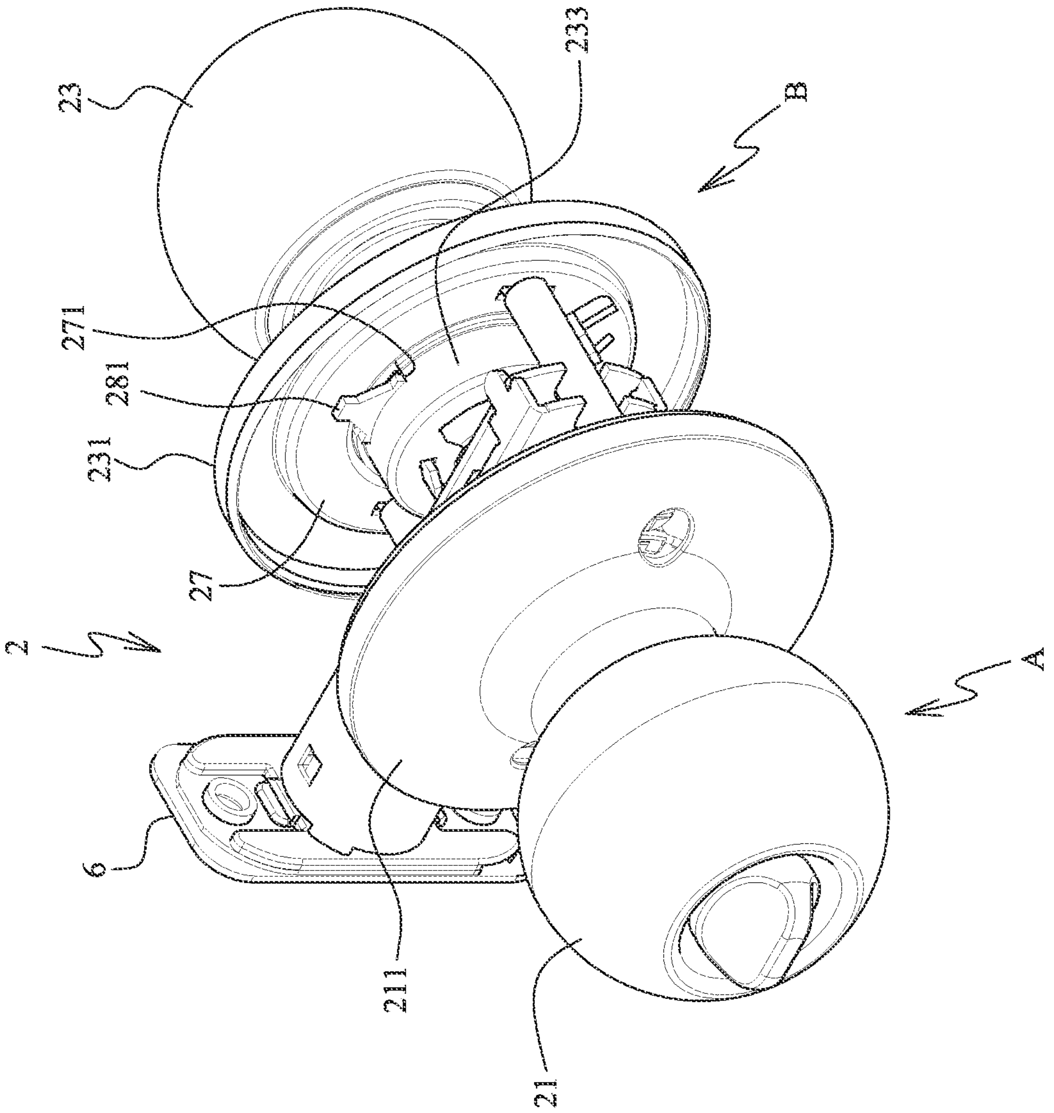
FIG. 1 is a perspective view to show the first embodiment of the door lock of the present invention.

Referring to FIGS. 1 to 5, the first embodiment of the door lock of the present invention comprises a driving part 1 that is a tubular part and connected to a first knob 21 of the door lock 2. The driving part 1 includes at least one restriction portion 11 formed to the inner periphery thereof.

An inner tube 3 is received in the driving part 1 and has a positioning portion 31 located corresponding to the at least one restriction portion 11 so as to restrict rotational movement of the inner tube 3 in the driving part 1. The inner tube 3 is movable within the driving part 1 axially. At least one restriction unit 32 is formed axially in the inner periphery of the inner tube 3.

A shaft 4 has a connection portion 41 formed to one of two ends thereof, and the connection portion 41 includes a positioning unit 411 located corresponding to the at least one restriction unit 32 so as to restrict rotational movement of the shaft 4 in the inner tube 3. The shaft 4 is axial moveable in the inner tube 3.

Figure 4:
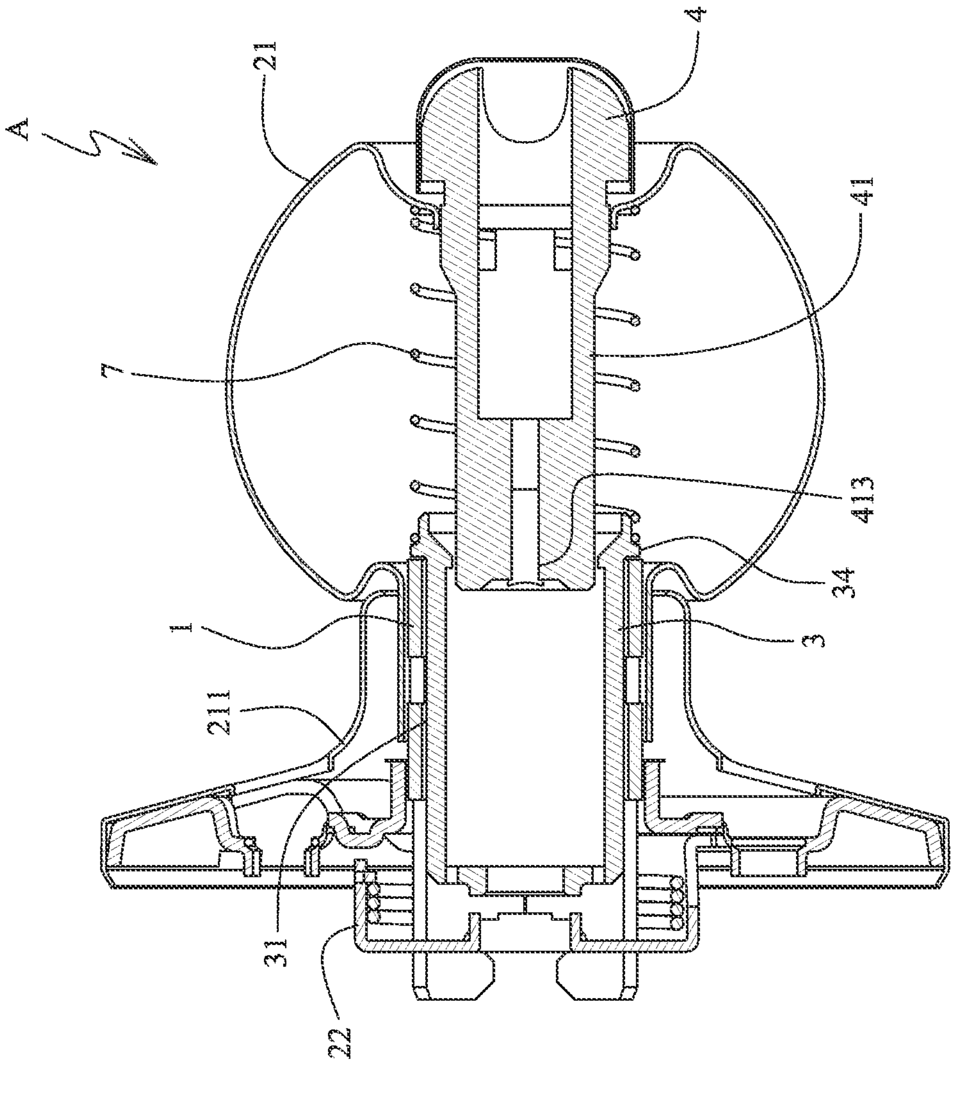
FIG. 4 is a cross sectional view of the first unit of the first embodiment of the door lock of the present invention when the door lock is not yet assembled.

The inner tube 3 is axially movable in the driving part 1 by the restriction portion 11 of the driving part, and the restriction member 11 also restricts the rotational movement of the inner tube 3 in the driving part 1. By the restriction unit 32 and the positioning unit 411, the rotational movement of the shaft 4 is also restricted, and the inner tube 3 is axially movable relative to the shaft 4. The purposes of the present invention are that the when assembling the door lock 2, as shown in FIG. 4, the driving part 1, the inner tube 3 and the shaft 4 are pre-assembled as a one piece so as to easily align the related parts when assembling the door lock 2. The pre-assembled parts of the door lock 2 do not drop easily during assembly and can easily be installed to a door 5.

The door lock 2 may include knobs or levers, the following embodiments take the door lock 2 with the knobs as examples, but not limited thereto.

Figure 2:
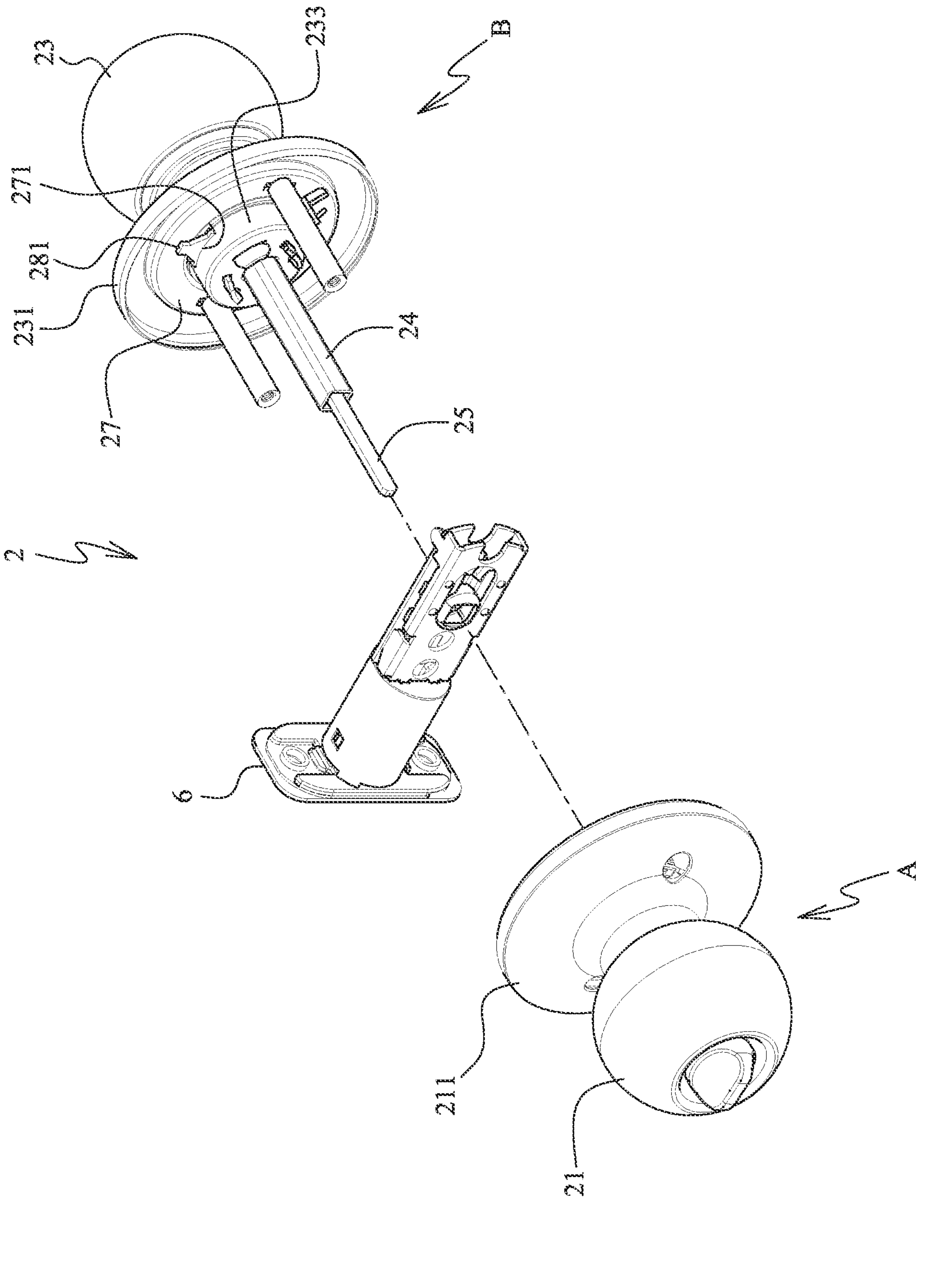
FIG. 2 is an exploded view of the first embodiment of the door lock of the present invention.
Figure 3:
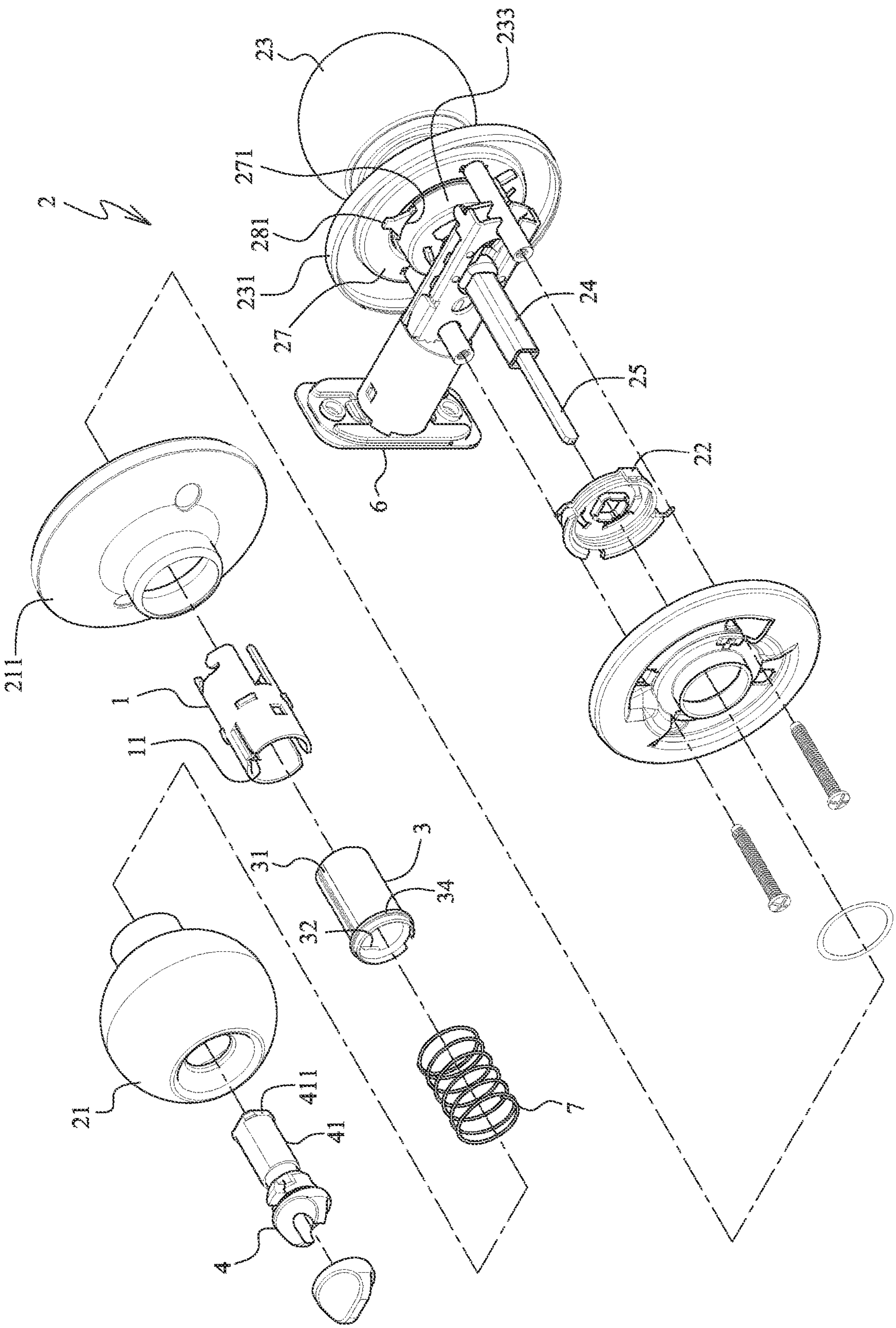
FIG. 3 is an exploded view of the first unit of the first embodiment of the door lock of the present invention.
Figure 5:
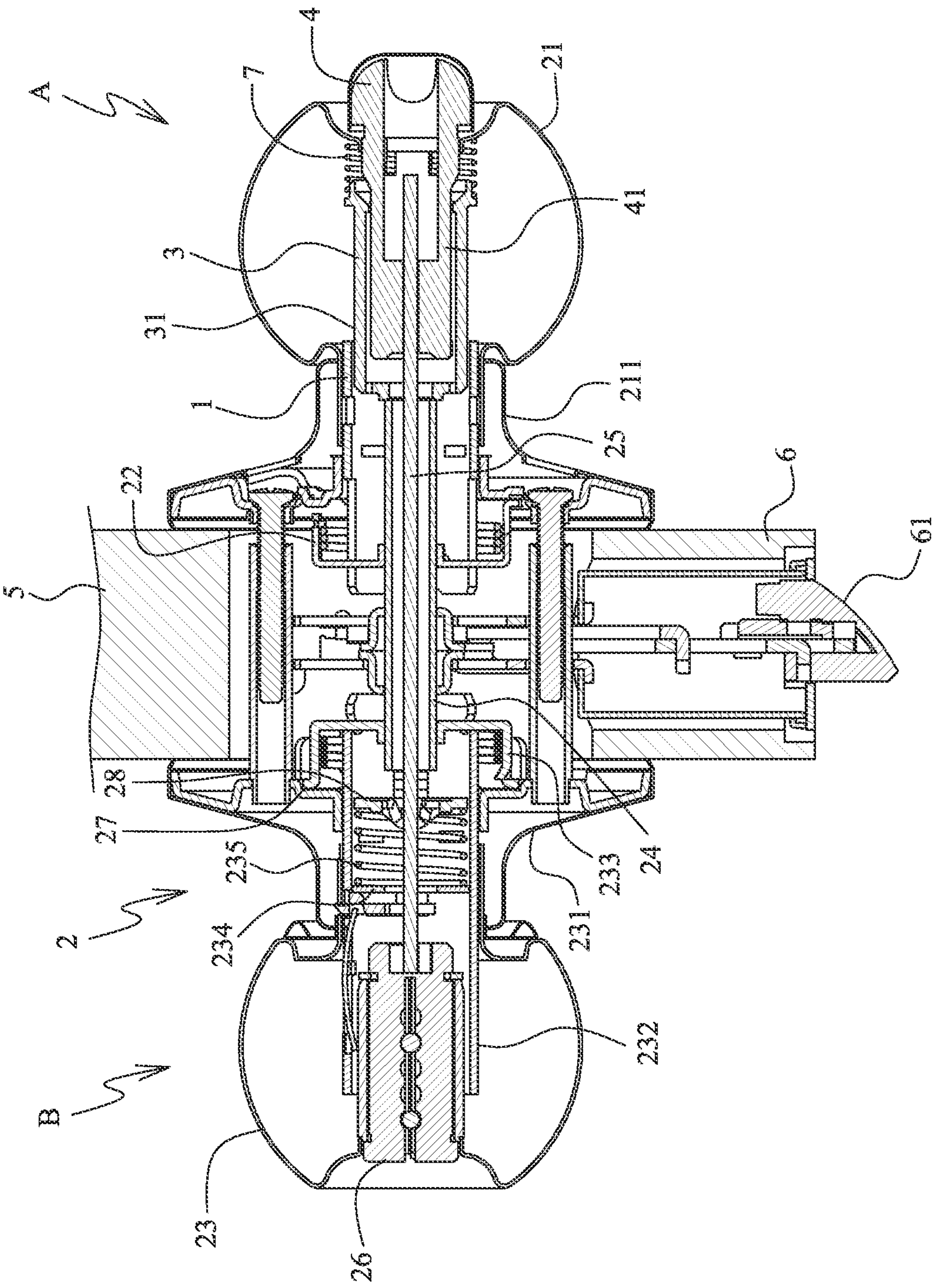
FIG. 5 is a cross sectional view of the first embodiment of the door lock of the present invention when the door lock is assembled.
Figure 6:
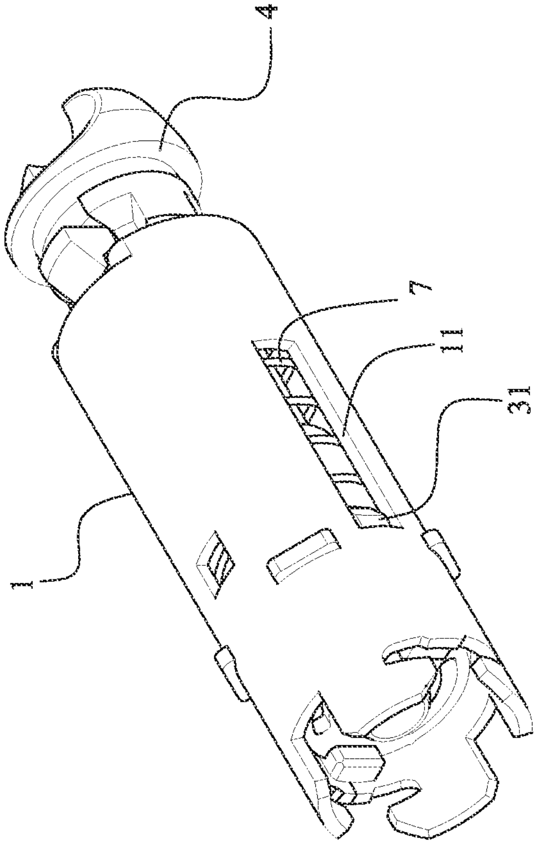
FIG. 6 shows the driving part with the inner tube and the shaft of the second embodiment of the door lock of the present invention.
Figure 7:
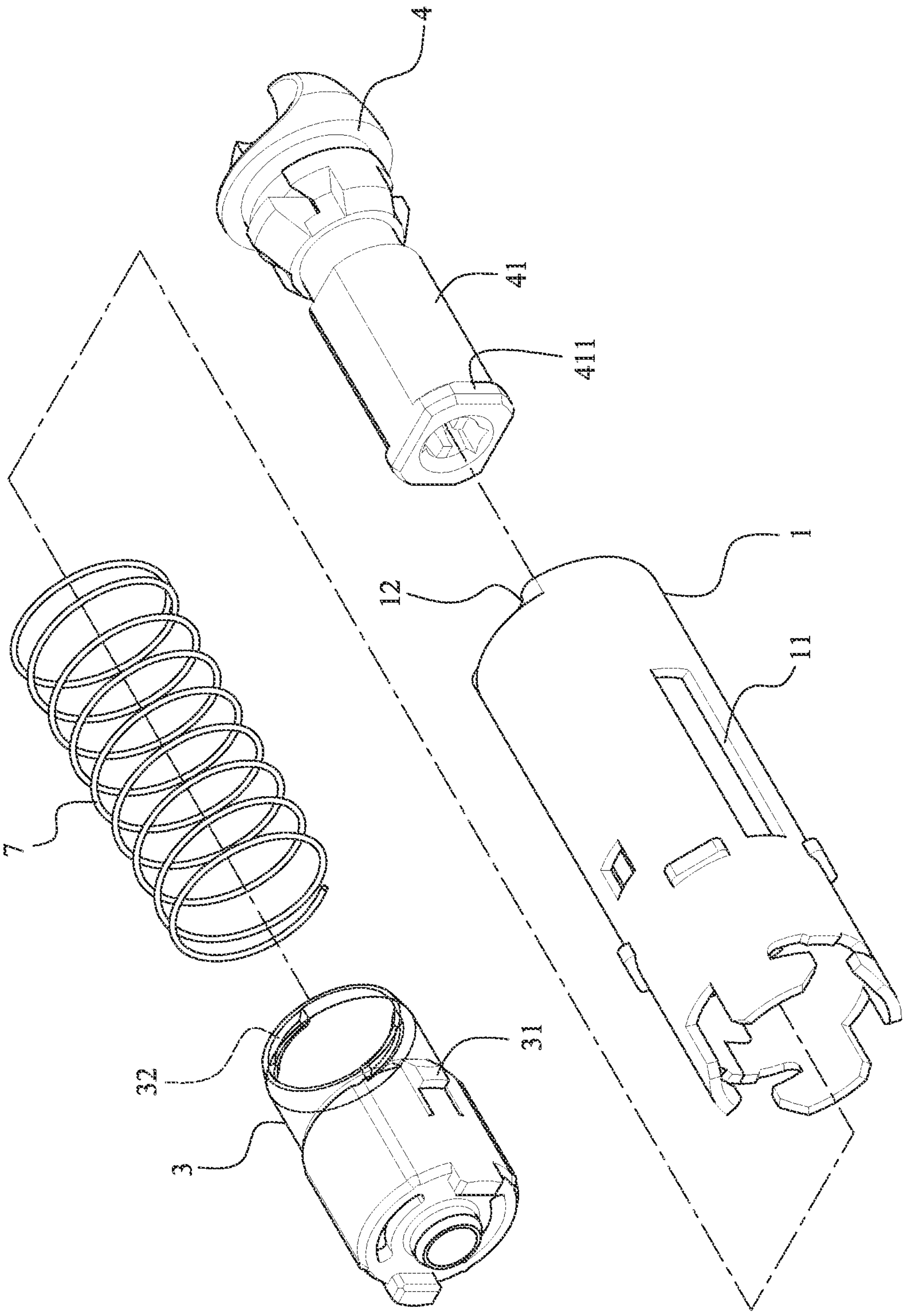
FIG. 7 is an exploded view to show the driving part, the inner tube and the shaft of the second embodiment of the door lock of the present invention.

As shown in FIG. 2, the door lock 2 includes a first unit "A", a second unit "B" and a latch assembly 6. The first unit "A" is installed to the inside of the door 5 and include a first knob 21, so that the users may rotate a turning piece equipped on the first knob 21 to rotate the shaft 4 to operate the door lock 2. The driving part 1 is connected to and rotated by the first knob 21 so as to operate the latch assembly 6. The inner tube 3 can be driven by the driving column 24 or the spindle 25 of the second unit "B" so as to be properly installed to a door 5 according to the thickness of the door 5. When the inner tube 3 is pushed by the driving column 24 or the spindle 25 as shown in FIG. 5, the positioning unit 411 of the shaft 4 is disengaged from the restriction unit 32 of the inner tube 3 so as to remove the rotation restriction of the shaft 4 in the inner tube 3. The purpose for that is when the door lock 2 is installed to a door 5, the rotation of the shaft 4 is independent from the driving part 1. The shaft 4 is used to be connected to the spindle 25 of the second unit "B". By rotating the turning piece of the first knob 21, the shaft 4 together with the driving column 24 and the spindle 25 are rotated. The driving column 24 rotates the latch assembly 6 to lock the door lock 2. The second unit "B" and the latch assembly 6 are well known in the conventional door locks 2.

In one embodiment, the restriction portion 11 is formed as a recess in the driving part 1 by way of pressing or integral forming so that the restriction portion 11 forms a protrusion in the inner periphery of driving part 1. The positioning portion 31 of the inner tube 3 is set to be a recess corresponding to the restriction portion 11 so as to restrict rotation of the inner tube 3 while allow the inner tube 3 to move axially. In one embodiment, there are two restriction portions 11 symmetrically formed to the driving part 1, so that the inner tube 3 is installed in the driving part 1 in two directions of 0 degree and 180 degrees.

Figure 8:
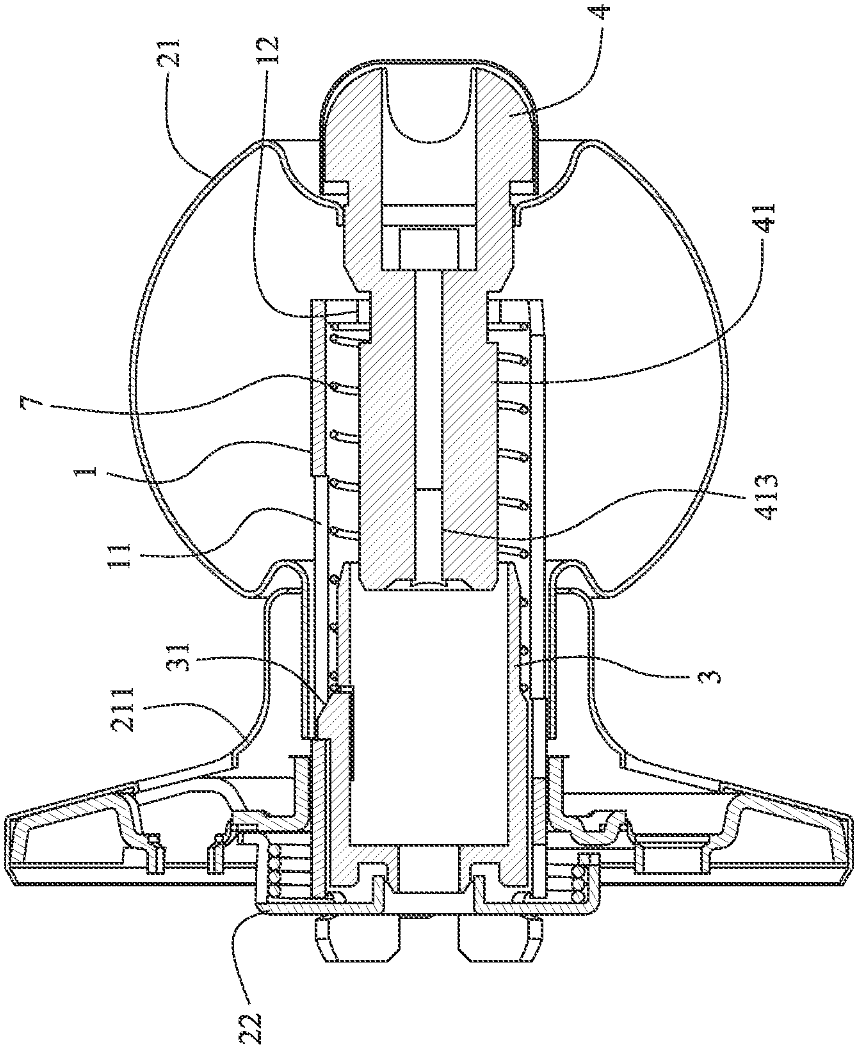
FIG. 8 is a cross sectional view of the first unit of the second embodiment of the door lock of the present invention when the door lock is not yet assembled.
Figure 9:
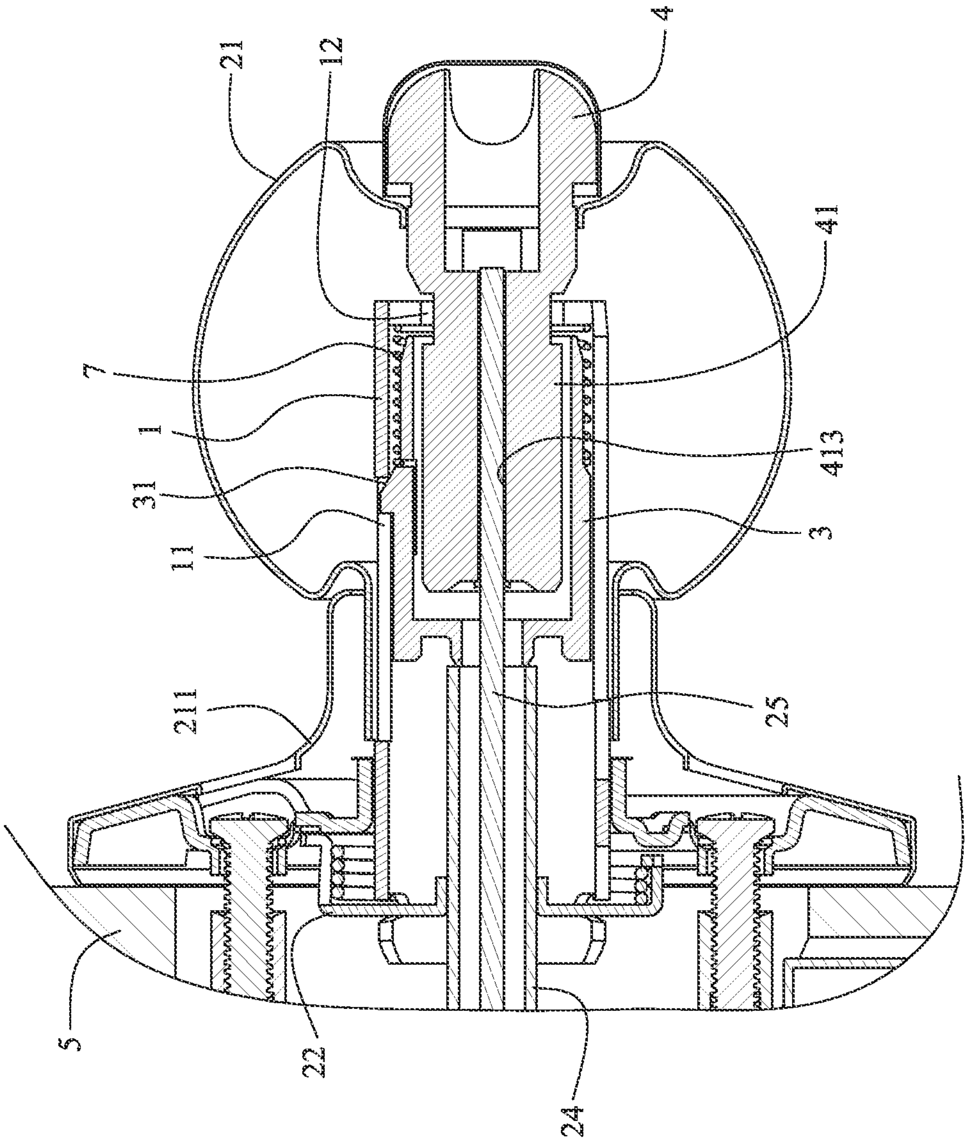
FIG. 9 is a cross sectional view of the first unit of the second embodiment of the door lock of the present invention when the door lock is assembled.
Figure 10:
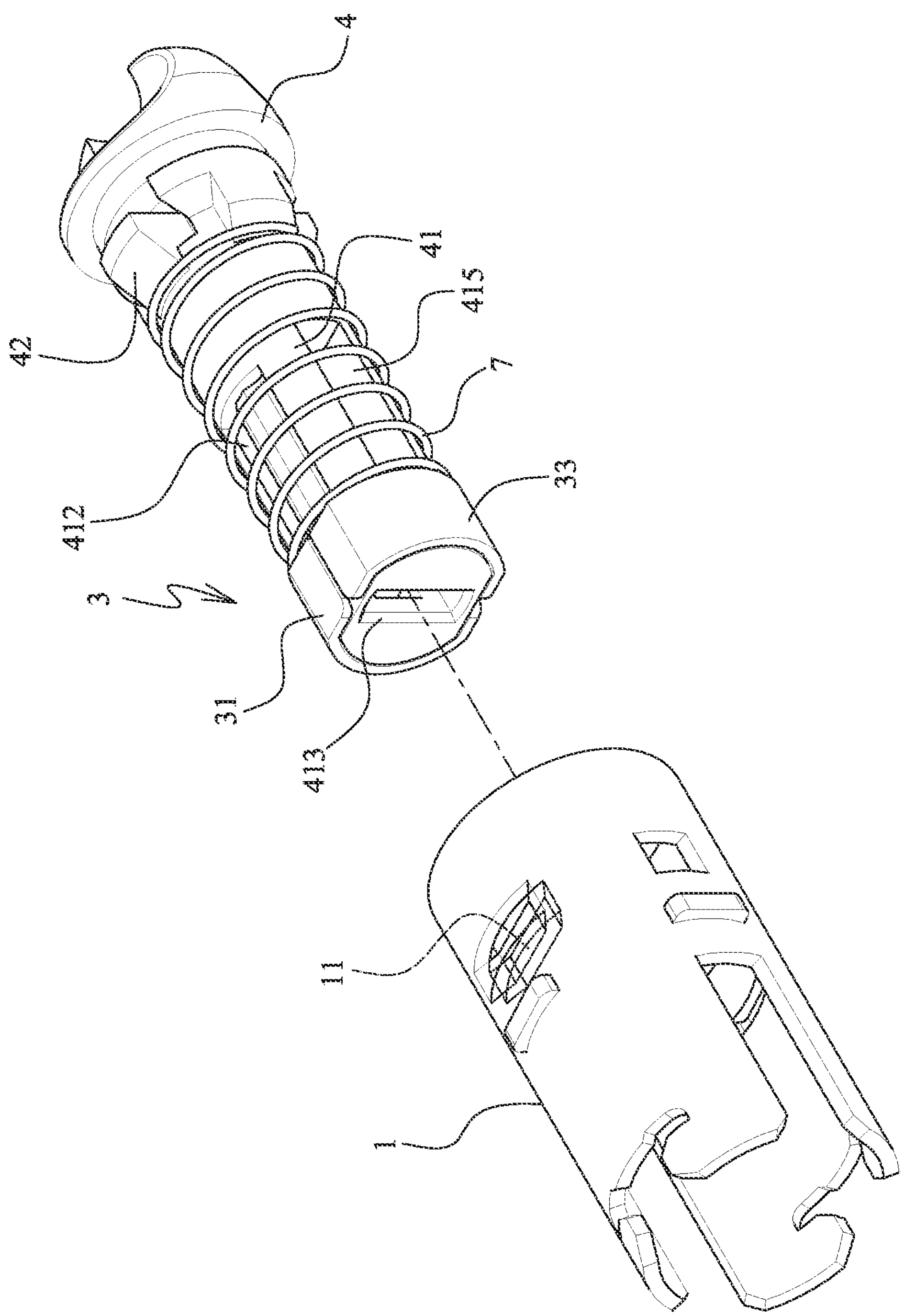
FIG. 10 shows the driving part and the inner tube with the shaft of the third embodiment of the door lock of the present invention.
Figure 11:
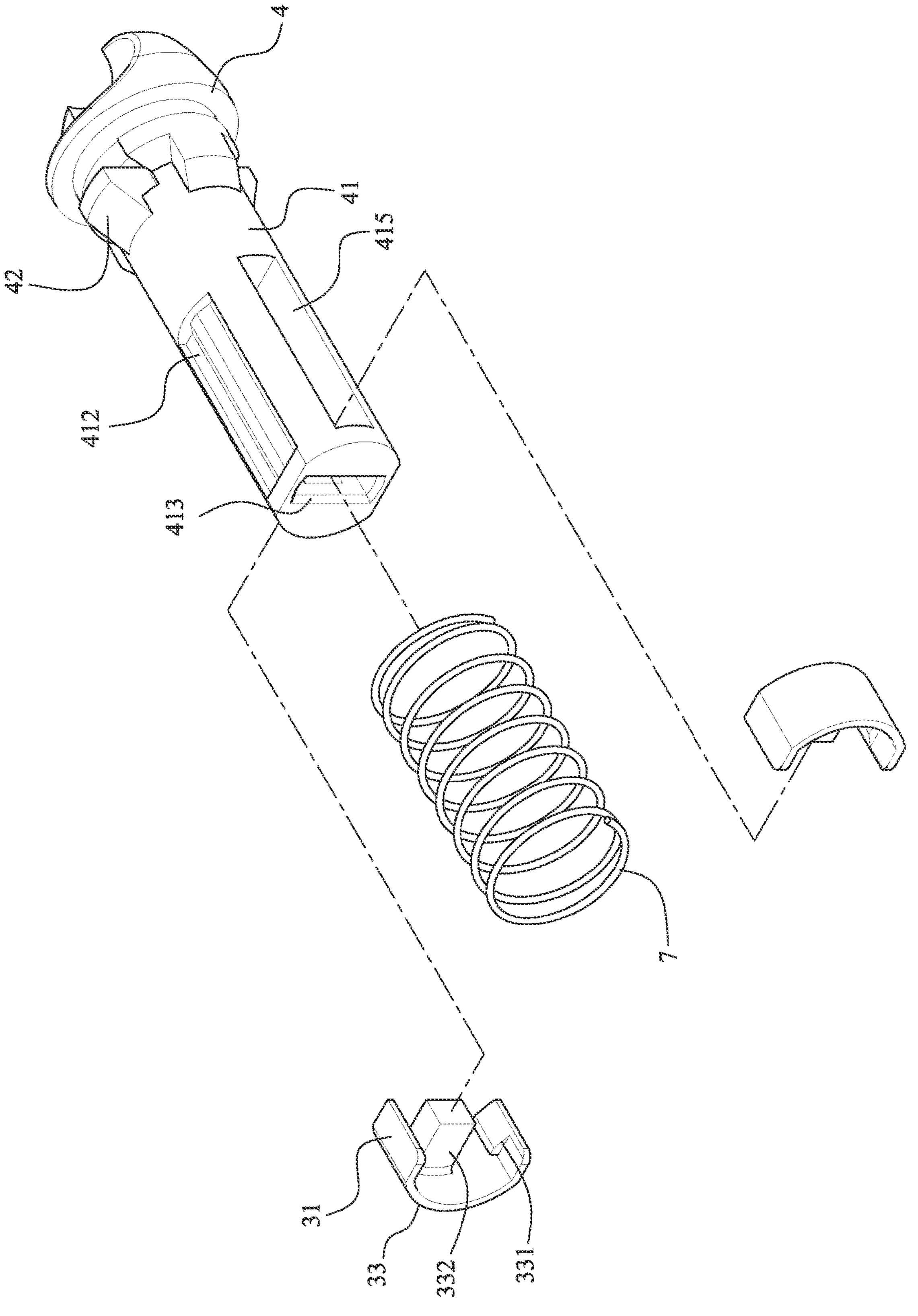
FIG. 11 is an exploded view to show the shaft, the first spring and the blocks of the third embodiment of the door lock of the present invention.
Figure 12:
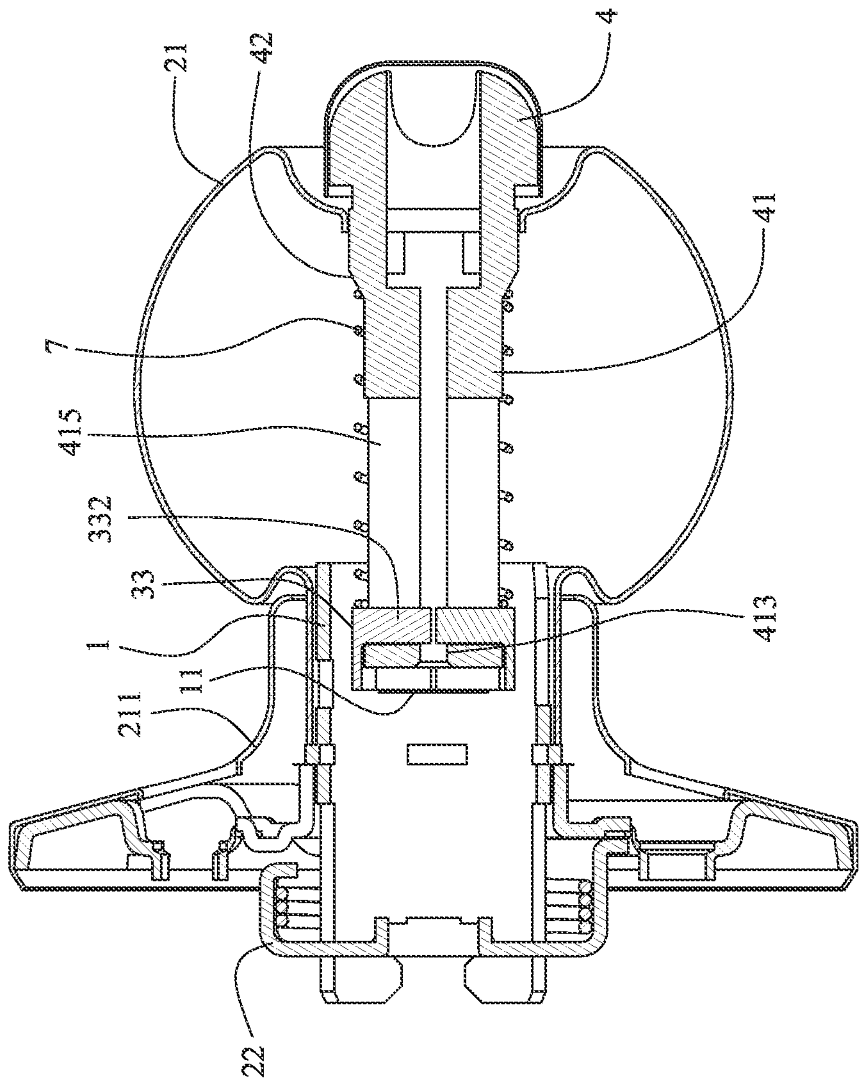
FIG. 12 is a cross sectional view of the first unit of the third embodiment of the door lock of the present invention when the door lock is not yet assembled.
Figure 13:
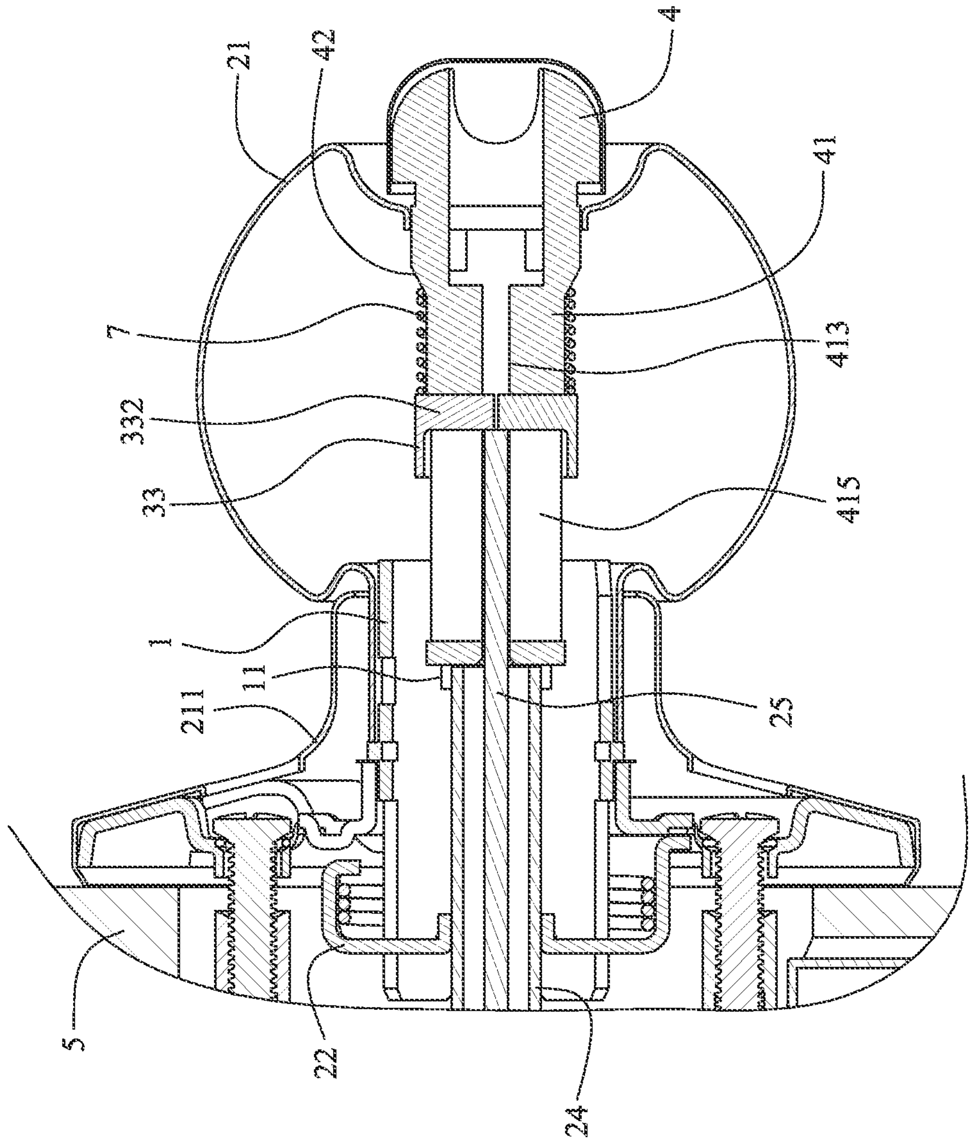
FIG. 13 is a cross sectional view of the first unit of the third embodiment of the door lock of the present invention when the door lock is assembled.
Figure 14:
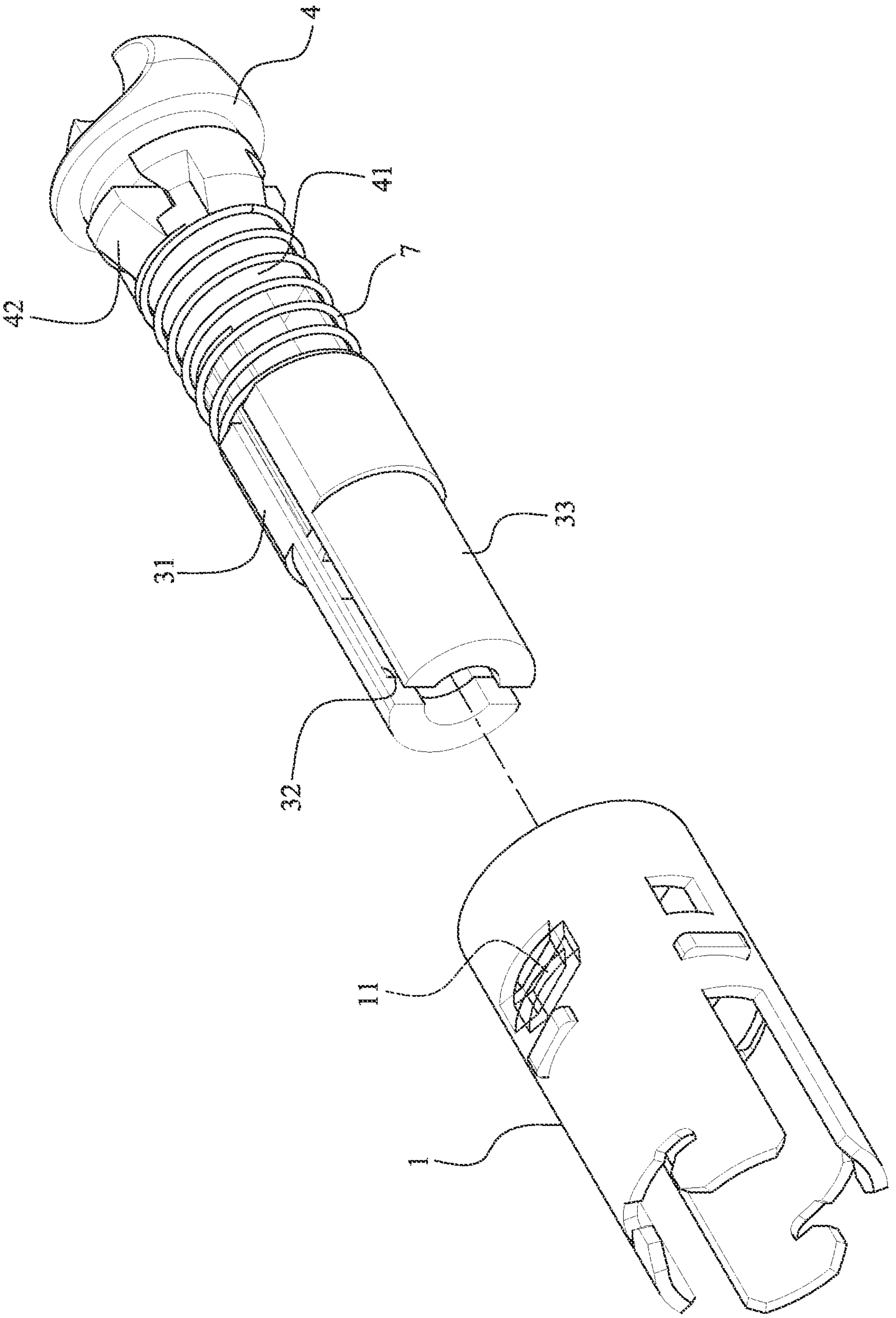
FIG. 14 shows the driving part and the inner tube with the shaft of the fourth embodiment of the door lock of the present invention.
Figure 15:
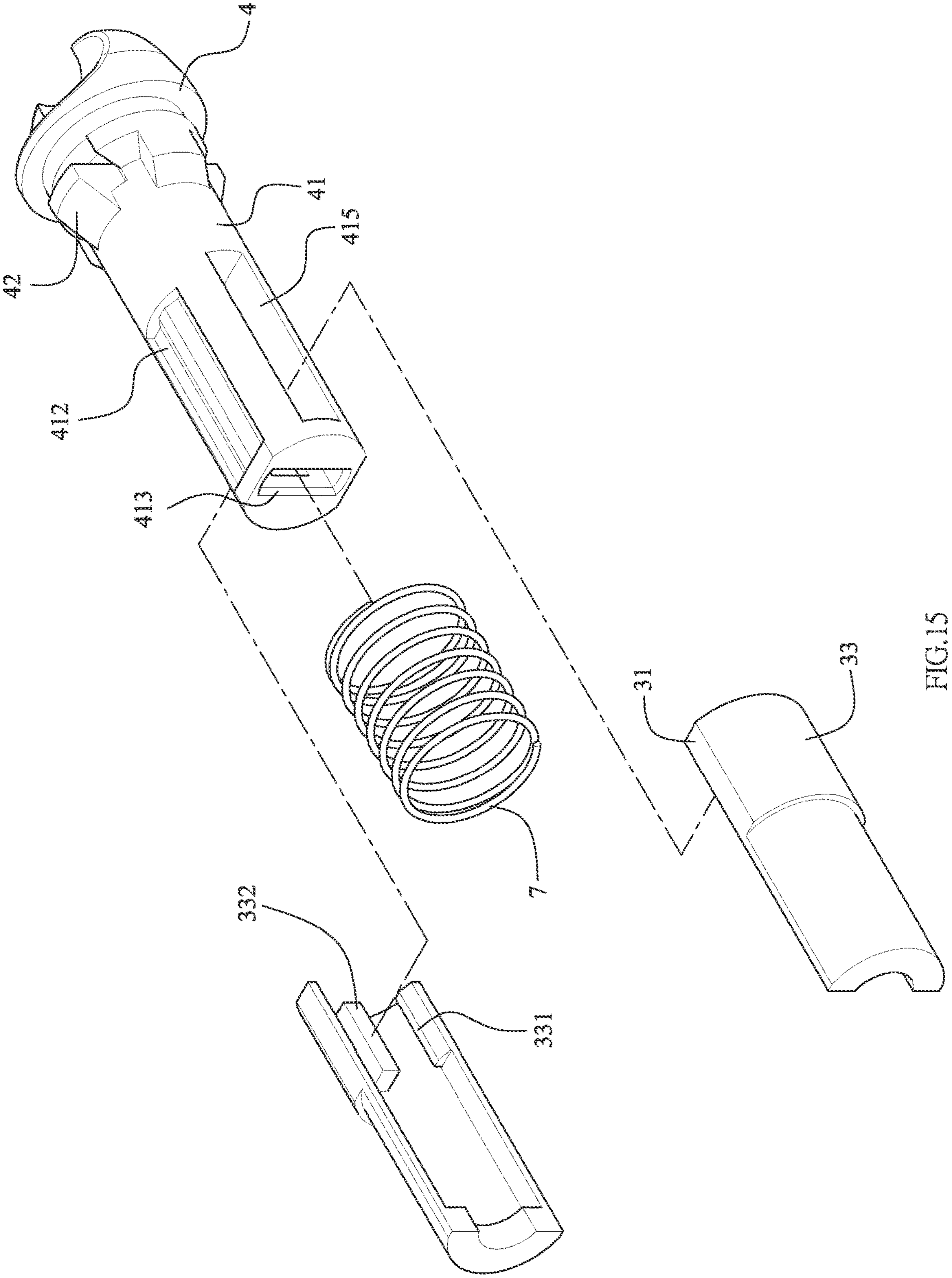
FIG. 15 is an exploded view to show the shaft, the first spring and the blocks of the fourth embodiment of the door lock of the present invention.
Figure 16:
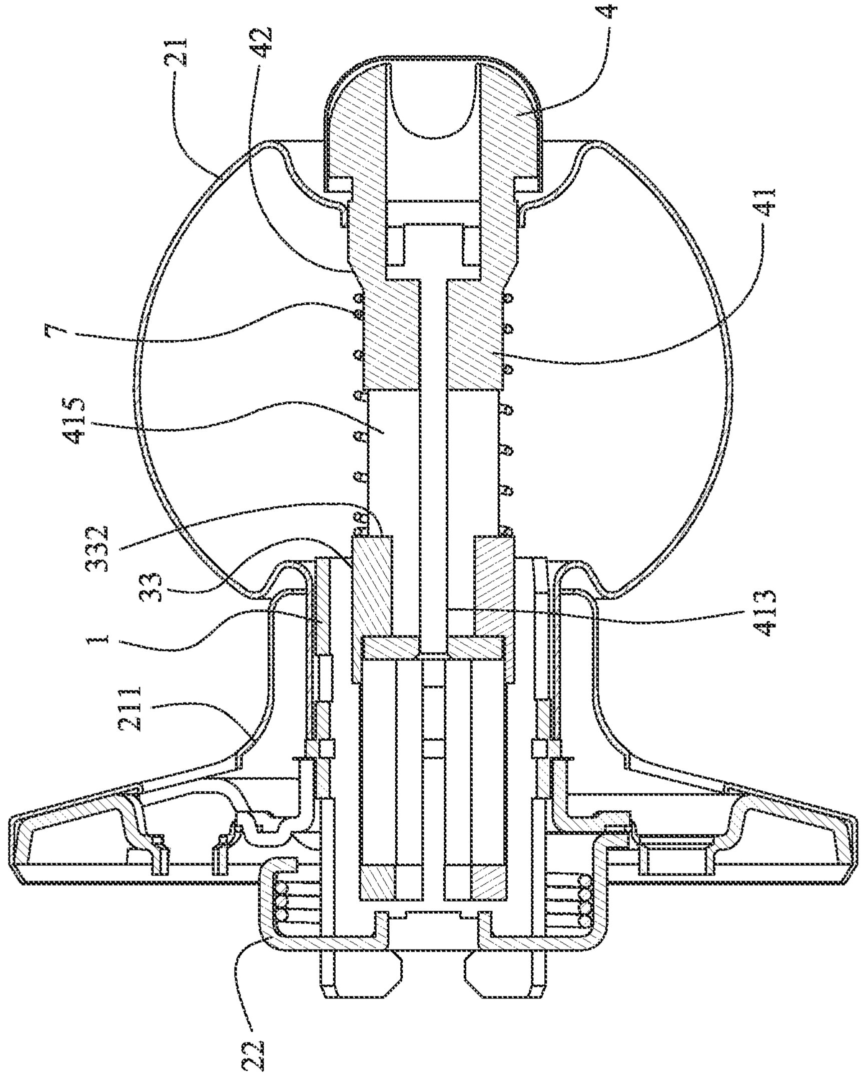
FIG. 16 is a cross sectional view of the first unit of the fourth embodiment of the door lock of the present invention when the door lock is not yet assembled.
Figure 17:
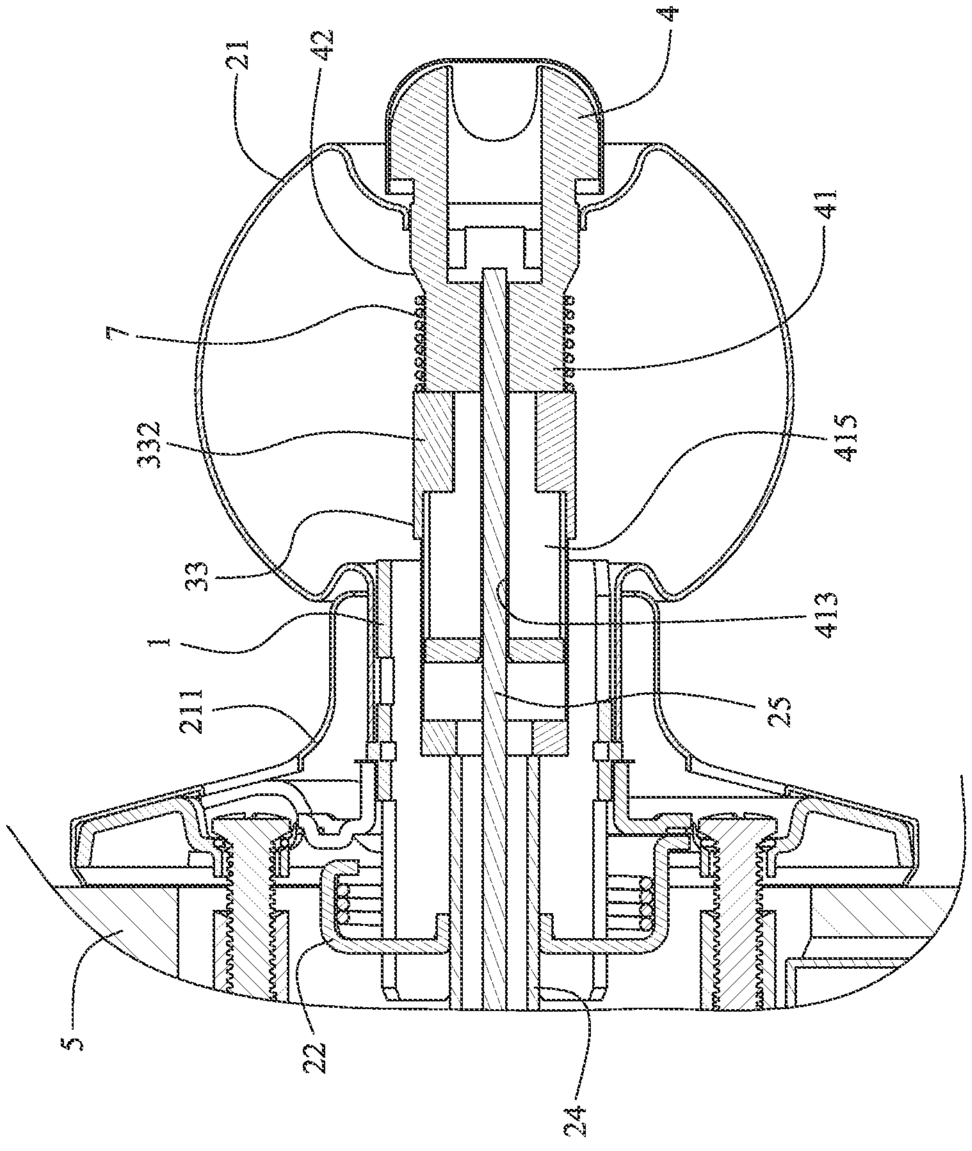
FIG. 17 is a cross sectional view of the first unit of the fourth embodiment of the door lock of the present invention when the door lock is assembled.
Figure 18:
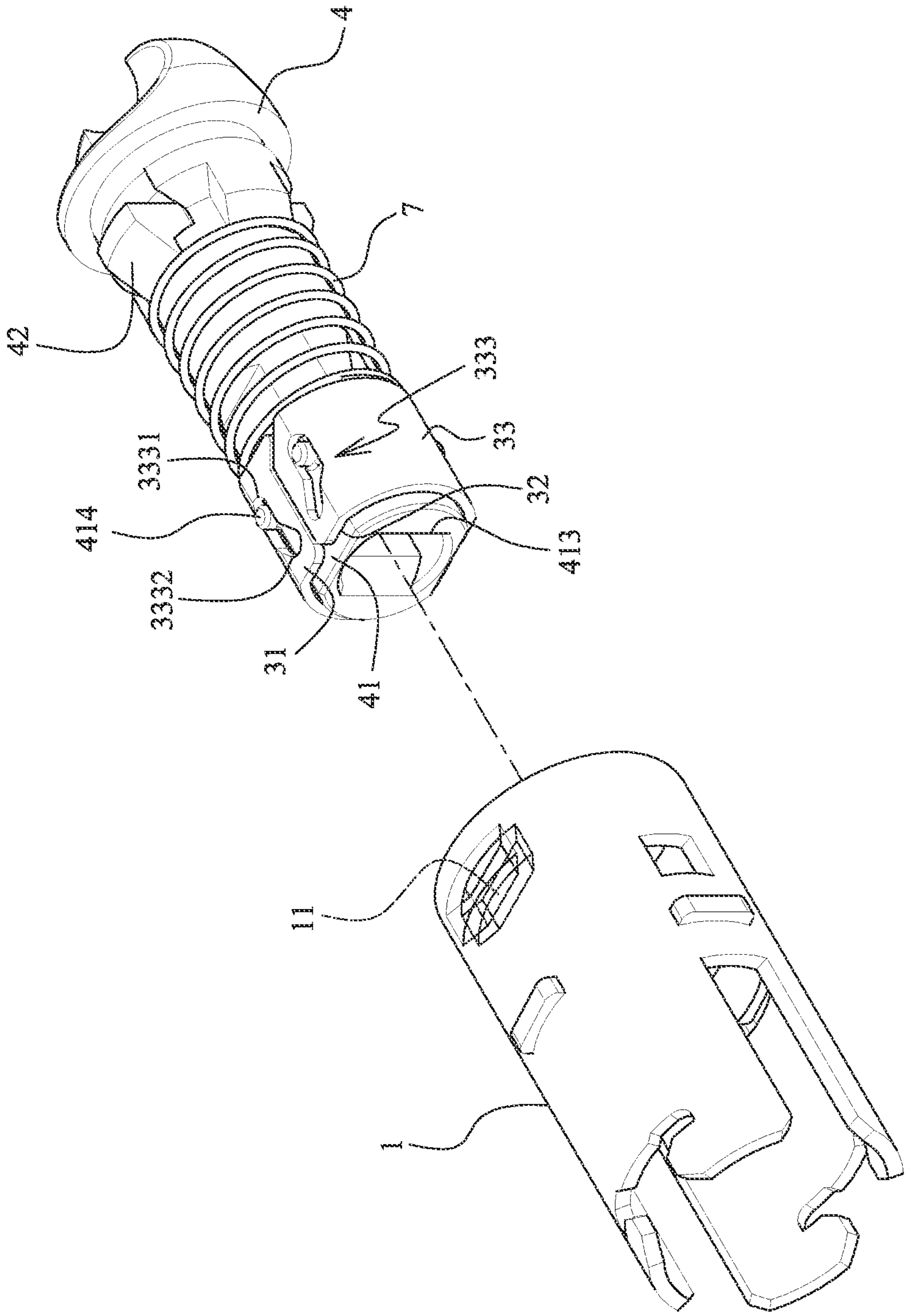
FIG. 18 is an exploded view to show the driving part, the inner tube and the shaft of the fifth embodiment of the door lock of the present invention.
Figure 19:
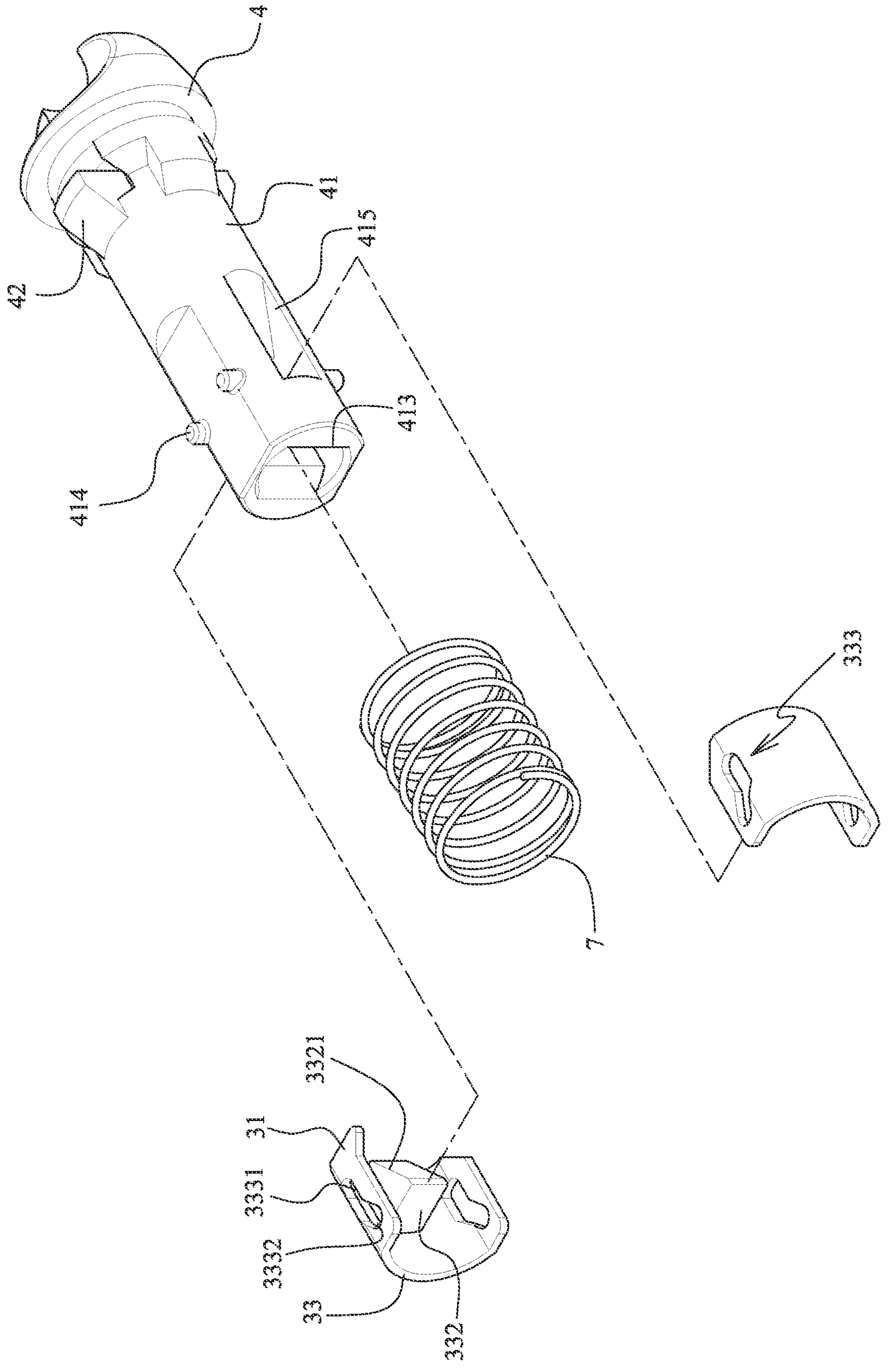
FIG. 19 is an exploded view to show the shaft, the first spring and the blocks of the fifth embodiment of the door lock of the present invention.
Figure 20:
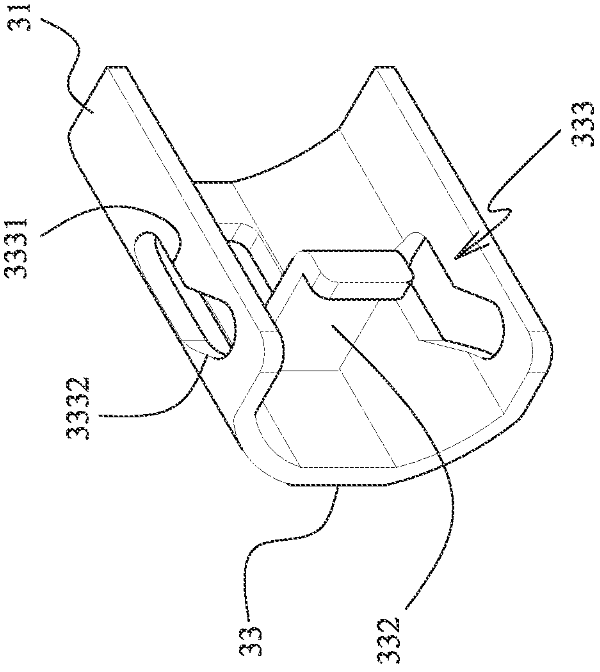
FIG. 20 show the block of the fifth embodiment of the door lock of the present invention.

As shown in FIGS. 6 to 9 which show the second embodiment, wherein the positioning portion 31 and the at least one restriction portion 11 are a sliding block and a groove. In this embodiment, the positioning portion 31 is the sliding block protruded from the inner tube 3 and the restriction portion 11 is a recessed groove or a groove defied through the wall of the driving part 1. Therefore, the positioning portion 31 is the sliding block protruded from the inner tube 3 so that the positioning portion 31 includes a flexibility in the radial direction so that when the inner tube 3 is inserted into the driving part 1, the positioning portion 31 can be compressed and then is engaged with the restriction portion 11 when being aligned with the restriction portion 11. As shown in FIGS. 8 and 9, the inner tube 3 is driven by the driving column 24 to remove the positioning unit 411 of the shaft 4 from the restriction unit 32 of the inner tube 3 to release the rotation restriction of the shaft 4.

As shown in FIGS. 10 to 23, the positioning portion 31 and the at least one restriction portion 11 are two correspondent planes. The driving part 1 can be made by pressing or integral forming to form the restriction portion 11. The positioning portion 31 of the inner tube 3 can be made by cutting to achieve the purpose of rotation restriction while the inner tube 3 can move axially.

As disclosed in the first and second embodiments, the at least one restriction unit 32 and the positioning unit 411 are two planes that are located corresponding to each other.

When the second unit "B" is not yet installed, the rotation of the shaft 4 is restricted. When the second unit "B" is installed, the inner tube 3 is axially movable. Besides, in one embodiment, the inner tube 3 may include two restriction units 32 which are located symmetrically to each other. Therefore, the shaft 4 can be inserted into the inner tube 3 in the 0 degree direction and the 180 degrees direction.

The inner tube 3 is an integral part as disclosed in the first and second embodiments. The third embodiment as shown in FIGS. 10 to 13, the fourth embodiment as shown in FIGS. 14 to 17, and the fifth embodiment as shown in FIGS. 18 to 23, the inner tube 3 includes two blocks 33 which are radially mounted to the outer periphery of the connection portion 41 so as to be connected to the driving part 1 as mentioned before.

The differences of the blocks 33 of the third embodiment as shown in FIGS. 10 to 13 and the fourth embodiment as shown in FIGS. 14 to 17 are that the lengths of the blocks 33 of the third and fourth embodiments are different so as to be installed to the doors 5 of different thicknesses. Preferably, the blocks 33 of the third and fourth embodiments the restriction unit 32 includes a hook 331 formed to one end of the inner periphery of each block 33, and the positioning unit 411 of the connection portion 41 includes two axial grooves 412 formed to the outer periphery of the connection portion 41. The two hooks 331 of the two blocks 33 are engaged with the two axial grooves 412 so as to position the blocks 33 in the radial direction of the shaft 4, and the blocks 33 are able to slide in the axial grooves 412.

For the inner tube 3 of the third, the fourth and the fifth embodiments, the distal end of the inner tube 3 can be directly pushed by the driving column 24 or the spindle 25 so that the positioning portion 31 is disengaged from the restriction portion 11 of the driving part 1. By this way, when installing the door lock 2 to a door 5, the rotation restriction can be released. In other embodiments, the blocks 33 each have a push part 332 extending from the inner periphery thereof. The connection portion 41 includes a hole 413 formed to a distal end thereof. Two passages 415 are defined in the outer periphery of the connection portion 41 and communicate with the hole 413. The two push parts 332 extend through the two passages 415 and reach the hole 413. When the spindle 25 of the second unit "B" is inserted into to the hole 413, the push part 332 can be pushed simultaneously.

Because the doors 5 may have different thicknesses, in order to allow the first and second units "A", "B" to be successfully installed to the door 5, and to easily install the inner tube 3 or the shaft 4, and to remove the positioning portion 31 from the restriction portion 11, or to achieve the functions in the first and second embodiment wherein the positioning unit 411 is removed from the restriction unit 32, therefore, in one embodiment, a first spring 7 biases one end of the inner tube 3 so as to push the inner tube 3 toward the driving part 1.

As disclosed in the first embodiment, the inner tube 3 includes a protrusion 34 protruding from outside of one end of the inner tube 3, and the first spring 7 has one end thereof contacts the protrusion 34, and the other end of the first spring 7 directly contacts the inner side of the first knob 21. As disclosed in the second embodiment, the driving part 1 includes a contact part 12 protruding therefrom, and two ends of the first spring 7 are biased between the protrusion 34 and the contact part 12. As disclosed in the third to fifth embodiments, the inner tube 3 does not have the protrusion 34. The inner tube 3 may have a lip or the like on the end thereof, or on the outer periphery of the blocks 33 by way of gluing, welding or assembling. The shaft 4 includes a bump 42 protruding radially from one end of the connection portion 41, so that two ends of the first spring 7 are biased between the bump 42 and the blocks 33.

Figure 21:
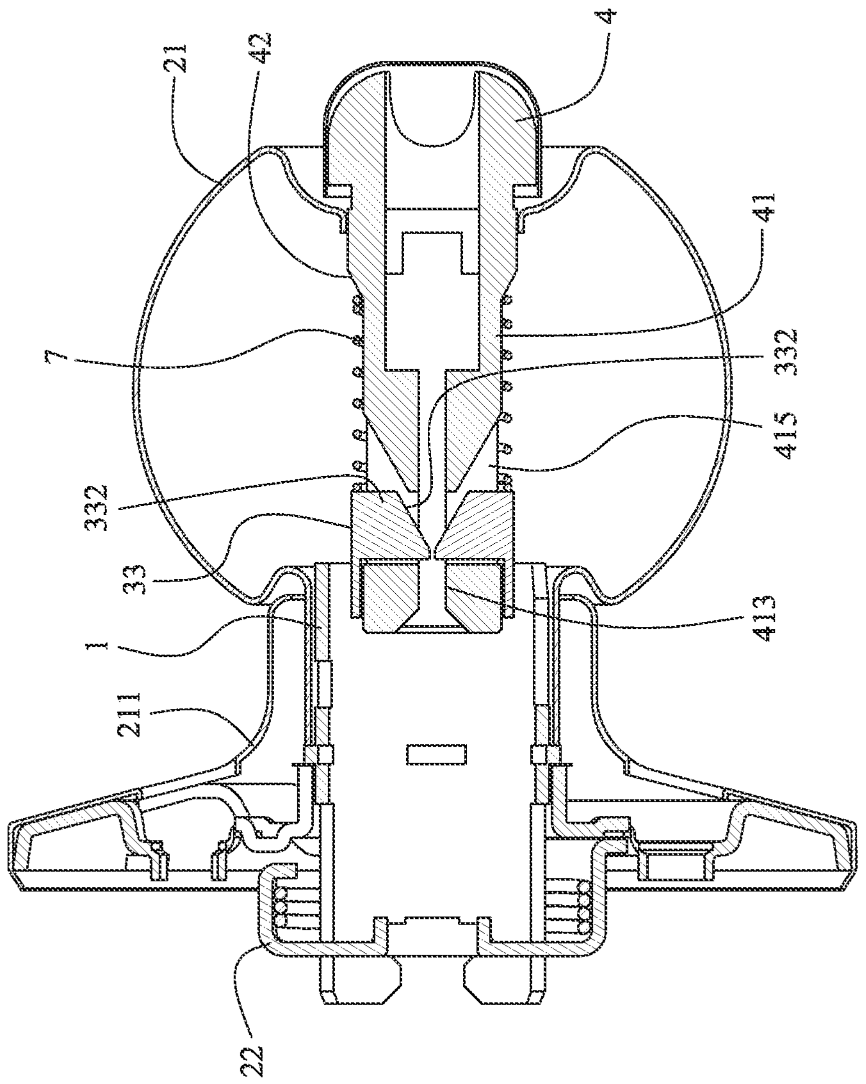
FIG. 21 is a cross sectional view of the first unit of the fifth embodiment of the door lock of the present invention when the door lock is not yet assembled.
Figure 22:
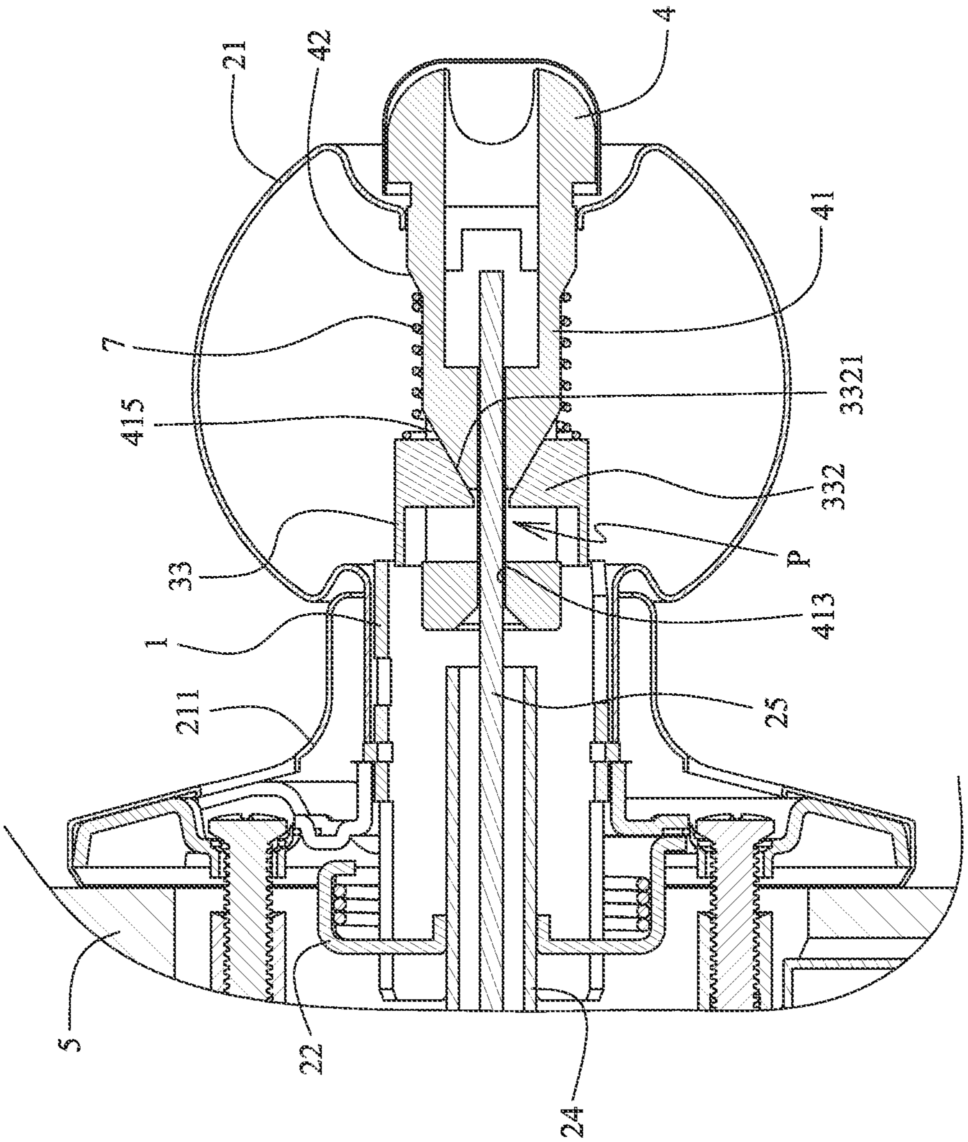
FIG. 22 is a cross sectional view of the first unit of the fifth embodiment of the door lock of the present invention when the door lock is assembled.
Figure 23:
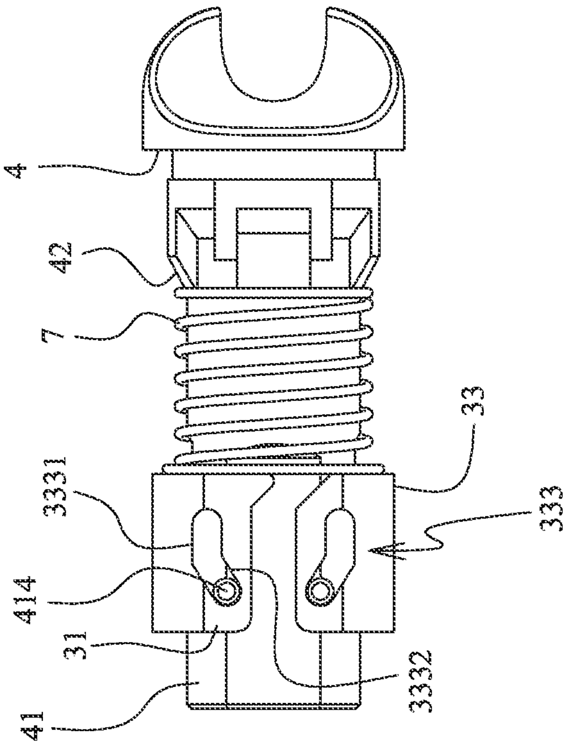
FIG. 23 shows that the blocks are moved radially outward relative to the shaft of the fifth embodiment of the door lock of the present invention.

When the door 5 is a thin door, the driving column 24 or the spindle 25 of the second unit "B" are inserted deeper to push the inner tube 3, so that the first spring 7 is compressed severely to store more energy. When one end of the first spring 7 contacts the inner side of the first knob 21, the first spring 7 does not affect the resistance of rotate the shaft 4. As shown in the third to fifth embodiments, when one end of the first spring 7 contacts the bump 42 of the shaft 4, it will create a larger resistance when rotate the shaft 4, such that the shaft 4 is difficult to rotate or cannot rotate smoothly. As shown in FIGS. 18 to 23, in the fifth embodiment, the at least one restriction unit 32 includes at least one guide portion 333 formed to each of the blocks 33. The positioning unit 411 includes two slide units 414 formed to the connection portion 41. The slide units 414 are located corresponding to the at least one guide portion 333 of each of the blocks 33. As shown in FIGS. 21 and 23, when the blocks 33 move along the connection portion 41 and toward the first spring 7, the blocks 33 move outward and radially relative to the slide units 414. The spring force of the first spring 7 in the axial direction is dispersed, so that when the door lock 2 is installed to a thin door 5, the shaft 4 can be rotated smoothly. In this embodiment, the blocks 33 are made by way of plastic injection molding. However, in order to improve the mechanical strength, the blocks 33 can be made by metal, such as manufactured by pressing and formed as the shape disclosed in FIG. 20. The blocks 33 made by pressed metal still have the guide portions 333. The push parts 332 are located as disclosed in the third embodiment.

The at least one guide portion 333 of each of the blocks 33 and the slide units 414 are correspondent channels and protrusions. In this embodiment, the guide portions 333 are the channel and the slide units 414 are the protrusions. Each channel includes a straight channel 3331 and an inclined channel 3332. The straight channel 3331 is defined axially in the connection portion 41, and the inclined channel 3332 extends outward and radially. In order to achieve the purpose of outward and radially move of the blocks 33 when the blocks 33 move toward the first spring 7 along the connection portion 41, an obtuse angle is formed between the straight channel 3331 and the inclined channel 3332. When the first spring 7 is compressed, the blocks 33 move outward, and when the first spring 7 recoveries, the blocks 33 are pushed back to located the protrusions in the straight channels 3331 so that the blocks 33 do not move outward. In order to allow the blocks 33 to easily move outward, each push part 332 includes an inclined face 3321, and the passage 415 also has an inclined face that is located corresponding to the inclined face 3321. By the inclined face 3321 of the push part 332 and the inclined face of the passage 415, the blocks 33 move outward smoothly. Therefore, when the door 5 is a thin door with the above-mentioned structure, the first spring 7 is not compressed severely to create large resistance for the rotation of the shaft 4. As shown in FIGS. 21 and 22, when the spindle 25 inserts into the hole 413, it will push the blocks 33 moved axially and outward movement, and a path "P" is formed when the blocks 33 moved to a certain distance, so that the spindle 25 cannot push the blocks 33 and extends through the path "P" so as not to compress the first spring 7 further. Accordingly, the shaft 4 can be rotated with less resistance.

The present invention can be used to a conventional door lock 2 to make the installation be easy and convenient. The present invention is described and explained by using the first embodiment, it is noted that, the present invention can also be used to other embodiments. As shown in FIGS. 1 to 4, and 24 to 25, when installing a door lock 2, the first unit "A" includes a first knob 21 pivotably connected to a first rosette 211 and drives a driving part 1. The driving part 1 is a tubular part and has at least one restriction portion 11 formed to the inner periphery thereof.

An inner tube 3 is received in the driving part 1 and has a positioning portion 31 located corresponding to the at least one restriction portion 11 so as to restrict rotational movement of the inner tube 3 in the driving part 1. The inner tube 3 is movable within the driving part 1 axially, and the at least one restriction unit 32 is formed axially in the inner periphery of the inner tube 3.

A shaft 4 includes a connection portion 41 formed to one of two ends thereof. The connection portion 41 includes a positioning unit 411 located corresponding to the at least one restriction unit 32 so as to restrict rotational movement of the shaft 4 in the inner tube 3. The inner tube 3 is axially movable relative to the positioning unit 411 of the shaft 4. A first spring 7 is located between the shaft 4 and the inner tube 3.

As mentioned before, the driving part 1, the inner tube 3 and the shaft 4 can be assembled as a one piece to be assembled to the first unit "A" to enhance the installation efficiency and these parts do not drop easily.

Figure 24:
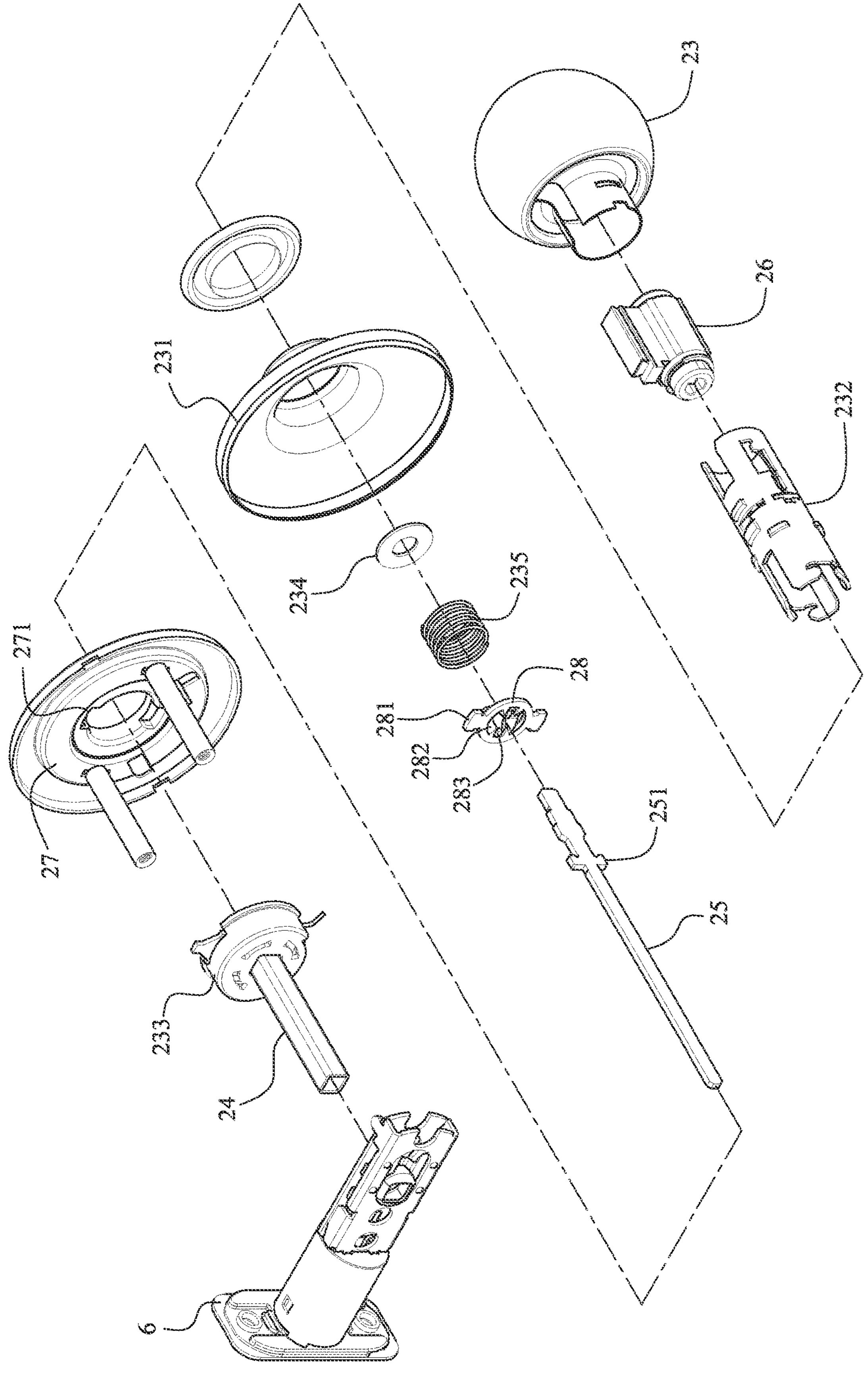
FIG. 24 is an exploded view to show the second unit of the first embodiment of the door lock of the present invention.
Figure 25:
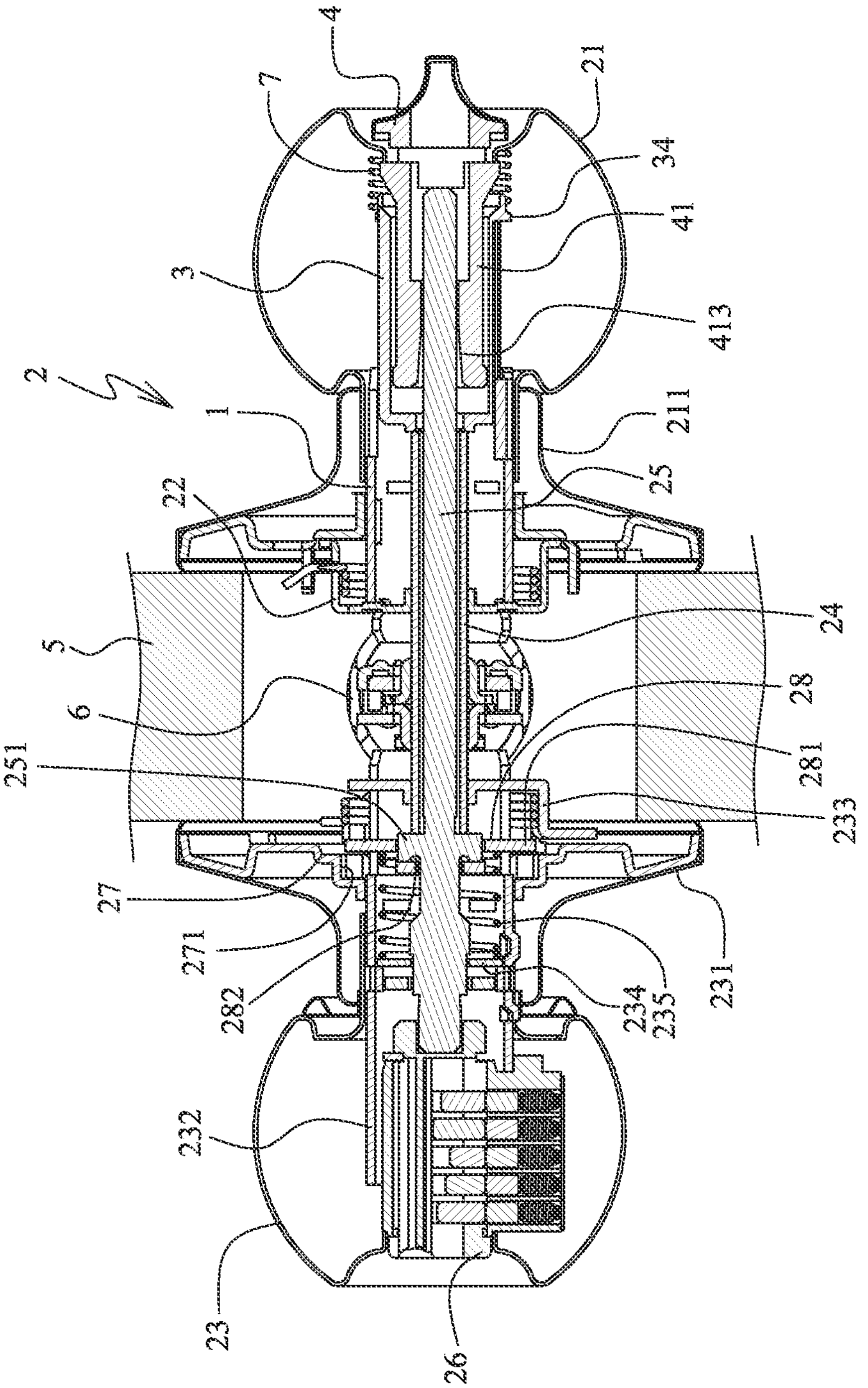
FIG. 25 is a cross sectional view to show that the door lock of the first embodiment of the present invention is in locked status.

As shown in FIGS. 24 and 25, the unit "B" includes a second knob 23 is located opposite to the first knob 21, and the second knob 23 includes a driving column 24 and a spindle 25. When the lock 2 is in an assembled status, one of the driving column 24 and the spindle 25 contacts the distal end of the inner tube 3, and the spindle 25 is connected to the shaft 4.

As shown in FIG. 2, the door lock 2 can be composed of the pre-assembled first unit "A", the second unit "B" and the latch assembly 6. When installing, the users extend the driving column 24 and the spindle 25 through the latch assembly 6. The spindle 25 is connected to the shaft 4. The shaft 4 is not rotated during the installing processes, hence the users simply slightly rotate the first unit "A", the spindle 25 is able to be connected to the shaft 4. On the contrary, for a conventional door lock, the shaft 4 has to be further rotated and adjusted its alignment to the spindle 25. Accordingly, the installation of the present invention is more convenient and easier.

The second knob 23 is pivotably connected to a second rosette 21 and drives a sleeve 232. The sleeve 232 includes a transmission unit 233 which includes the driving column 24 that is mounted to outside of the spindle 25. The driving part 1 includes a driving ring 22 which is connected to the driving column 24. The second knob 23 includes a lock cylinder 26 which is connected to the spindle 25. The second rosette 231 includes a mounting plate 27 received therein that has at least one notch 271. The spindle 25 includes a lug 251 extending radially therefrom. A lock ring 28 is mounted to the spindle 25 and connected to the sleeve 232. The lock ring 28 includes at least one tongue 281 extending radially therefrom and protruding beyond the sleeve 232 and located corresponding to the at least one notch 271. The lock ring 28 includes a first recess 282 and a second recess 283 located corresponding to the lug 251. A stop 234 is formed to the inner side of the sleeve 232. A second spring 235 is located between the stop 234 and the lock ring 28.

Accordingly, the first knob 21 drives driving part 1 and the driving ring 22 to rotate the driving column 24 so as to operate the latch assembly 6 to retract the latch bolt 61 to unlock the door lock 2. The latch assembly 6 is well known in the art. The second knob 23 is able to drive the transmission unit 233 via the sleeve 232 to rotate the driving column 24 to unlock the latch assembly 6.

Figure 26:
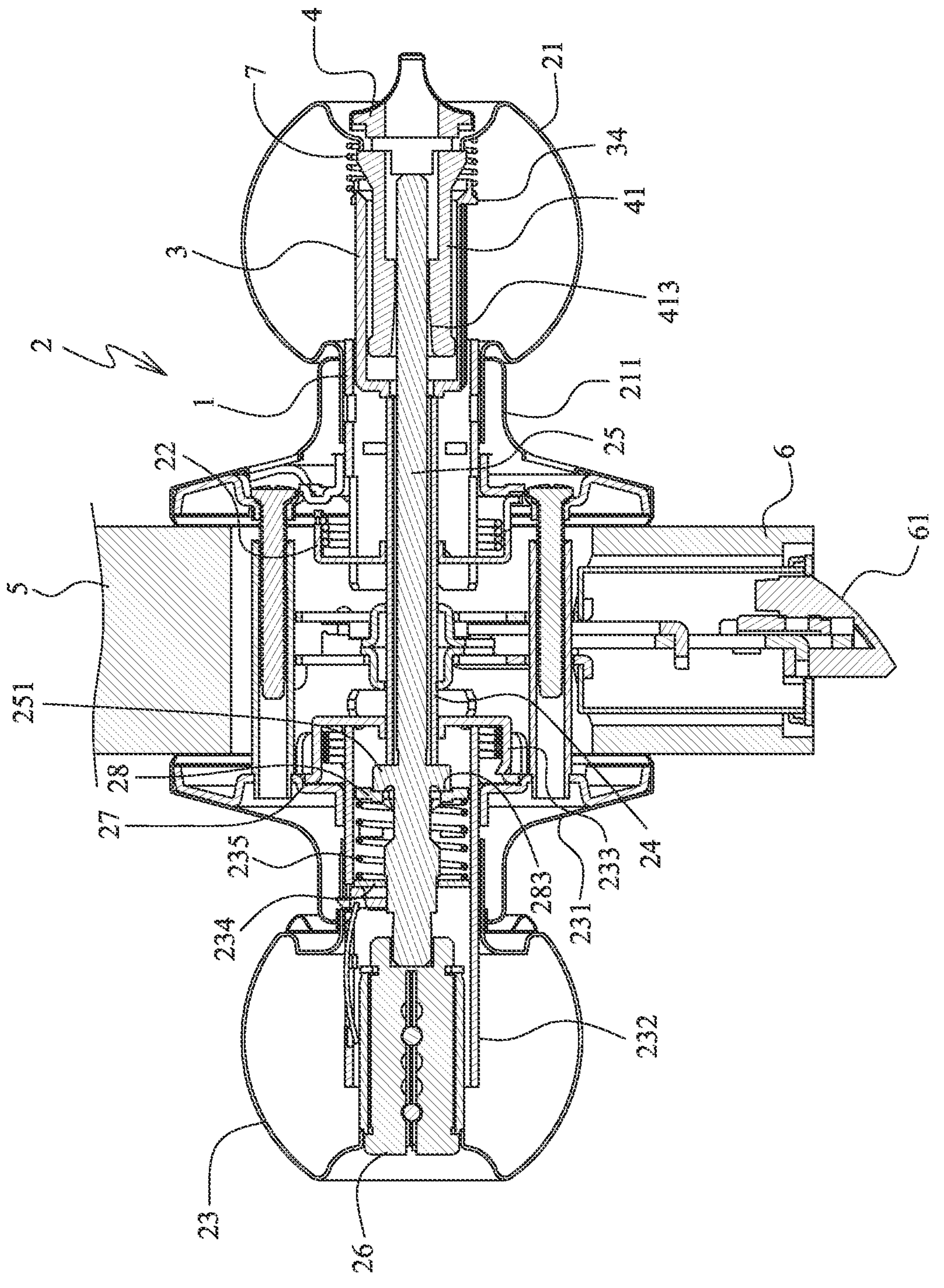
FIG. 26 is a cross sectional view to show the door lock of the first embodiment of the present invention as shown in FIG. 25, wherein the tongue is engaged with the notch when the door lock is in locked status.

The latch assembly 6 is operated by the spindle 25, and the spindle 25 is driven by the lock cylinder 26 or by the shaft 4. When in a locked status, as shown in FIGS. 25 and 26, the spindle 25 is rotated to locate the lug 251 in the second recess 283. It is noted that the second recess 283 is shallower than the first recess 282, such that the lock ring 28 compresses the second spring 235, and the at least one tongue 281 is engaged with the at least one notch 271. Due to the sleeve 232 is engaged with the lock ring 28, so that when the at least one tongue 281 is engaged with the at least one notch 271, the rotation of the sleeve 232 is restricted, hence the second knob 23 cannot drive the sleeve 232 to unlock the door lock 2 and therefore the door lock 2 to have anti-theft feature.

Figure 27:
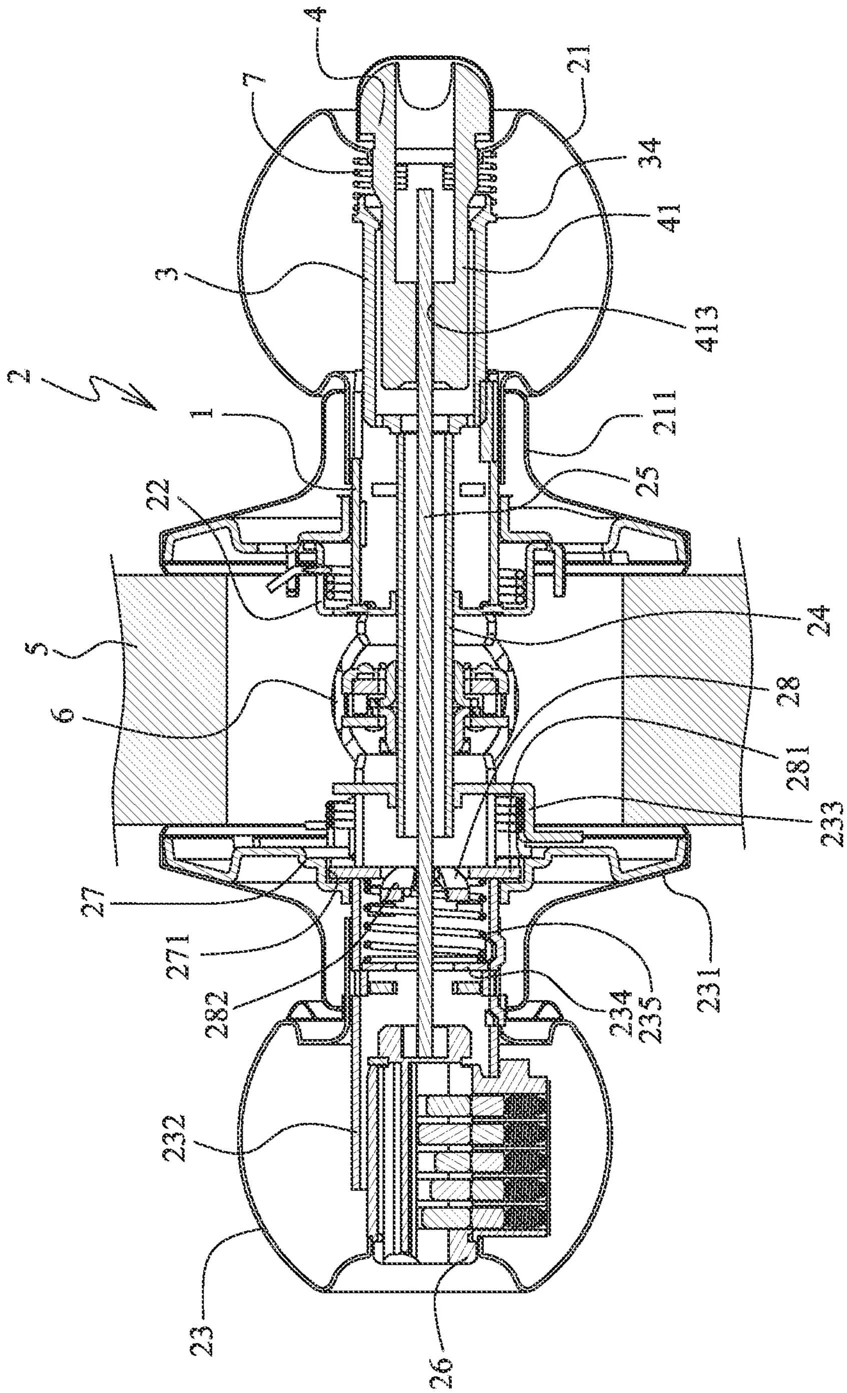
FIG. 27 is a cross sectional view to show that the door lock of the first embodiment of the present invention is in unlocked status.

As shown in FIG. 27, when in an unlock status, the spindle 25 is rotated to locate the lug 251 in the first recess 282. Since the second recess 283 is shallower than the first recess 282, and the axial position of the spindle 25 is not changed, hence the second spring 235 expands and axially bias the lock ring 28, such that the lug 251 is engaged with the first recess 282, and the at least one tongue 281 is disengaged from the at least one notch 271. Therefore, the first and second knobs 21, 23 are able to unlock the latch assembly 6 by rotation as described above.

As mentioned before, the second spring 235 biases the lock ring 28 toward the lug 251, in order to allow the spindle 25 to easily drive the lug 251 to be remove from the first recess 282 or the second recess 283, such that the first and second recesses 282, 283 each have a curve guide surface located on the rotational direction of the lug 251, such that when the spindle 25 is rotated, the lock ring 28 is axially pushed.

While we have shown and described the embodiment in accordance with the present invention, it should be clear to those skilled in the art that further embodiments may be made without departing from the scope of the present invention.

What is claimed is:

1. A rotary locked structure of a door lock, comprising:

a driving part being a tubular part and connected to a first knob of a lock, the driving part having at least one restriction portion formed to an inner periphery thereof;

an inner tube received in the driving part and having a positioning portion located corresponding to the at least one restriction portion so as to restrict rotational movement of the inner tube in the driving part, the inner tube being movable within the driving part axially, at least one restriction unit being formed axially in the inner periphery of the inner tube;

a shaft having a connection portion formed to one of two ends thereof, the connection portion including a positioning unit located corresponding to the at least one restriction unit so as to restrict rotational movement of the shaft in the inner tube, the inner tube being axially movable relative to the positioning unit of the shaft;

a second knob located opposite to the first knob, the second knob being pivotably connected to a rosette and driving a sleeve, the second knob including a spindle and a lock cylinder which is connected to the spindle, the spindle including a lug extending radially therefrom, the rosette including a mounting plate received therein that has at least one notch, the sleeve including a transmission unit which includes a driving column, a stop being formed to an inner side of the sleeve, the driving column of the sleeve being mounted to an outside of the spindle, one of the driving column and the spindle contacting an inner end of the inner tube, the spindle being connected to the shaft; and a lock ring mounted to the spindle and connected to the sleeve, the lock ring including a first recess and a second recess located corresponding to the lug of the spindle, and at least one tongue extending radially therefrom and protruding beyond the sleeve and located corresponding to the at least one notch, a spring being located between the stop and the lock ring, wherein the driving part includes a driving ring which is connected to the driving column of the sleeve, wherein, when in a locked status, the spindle is rotated to locate the lug in the second recess, such that the lock ring compresses the spring, and the at least one tongue is engaged with the at least one notch, and wherein, when in an unlock status, the spindle is rotated to locate the lug in the first recess, the spring expands and axially biases the lock ring, such that the lug is engaged with the first recess and the at least one tongue is disengaged from the at least one notch.

2. The rotary locked structure of a door lock as claimed in claim 1, wherein the positioning portion and the at least one restriction portion are two correspondent planes, a notch and a protrusion, or a sliding block and a groove.

3. The rotary locked structure of a door lock as claimed in claim 1, wherein the at least one restriction unit and the positioning unit are two planes that are located corresponding to each other.

4. The rotary locked structure of a door lock as claimed in claim 1, wherein the inner tube includes two blocks which are radially mounted to an outer periphery of the connection portion.

5. The rotary locked structure of a door lock as claimed in claim 4, wherein the at least one restriction unit includes a hook formed to an inner periphery of each block, the positioning unit of the connection portion includes two axial grooves formed to the outer periphery of the connection portion, the two hooks of the two blocks are engaged with the two axial grooves.

6. The rotary locked structure of a door lock as claimed in claim 5, wherein the blocks each have a push part extending from the inner periphery thereof, the connection portion includes a hole formed to a distal end thereof, two passages are defined in the outer periphery of the connection portion and communicate with the hole, the two push parts extend through the two passages and reach the hole.

7. The rotary locked structure of a door lock as claimed in claim 1, wherein an additional spring biases one end of the inner tube so as to push the inner tube toward the driving part.

8. The rotary locked structure of a door lock as claimed in claim 4, wherein the at least one restriction unit includes at least one guide portion formed to each of the blocks, the positioning unit includes two slide units formed to the connection portion, the slide units are located corresponding to the at least one guide portion of each of the blocks, when the blocks move toward the first knob, the blocks move outward and radially relative to the slide units to form a path between the two blocks.

9. The rotary locked structure of a door lock as claimed in claim 8, wherein the at least one guide portion of each of the blocks and the slide units are correspondent channels and protrusions, each channel includes a straight channel and an inclined channel, the straight channel is defined axially in the connection portion, and the inclined channel extends outward and radially.

10. A lock comprising:

a first knob pivotably connected to a first rosette and driving a driving part, the driving part being a tubular part and having at least one restriction portion formed to an inner periphery thereof;

an inner tube received in the driving part and having a positioning portion located corresponding to the at least one restriction portion so as to restrict rotational movement of the inner tube in the driving part, the inner tube being movable within the driving part axially, at least one restriction unit being formed axially in the inner periphery of the inner tube;

a shaft having a connection portion formed to one of two ends thereof, the connection portion including a positioning unit located corresponding to the at least one restriction unit so as to restrict rotational movement of the shaft in the inner tube, the inner tube being axially movable relative to the positioning unit of the shaft, a first spring being located between the shaft and the inner tube;

a second knob located opposite to the first knob, the second knob being pivotably connected to a second rosette and driving a sleeve, the second knob including a spindle and a lock cylinder which is connected to the spindle, the spindle including a lug extending radially therefrom, the second rosette including a mounting plate received therein that has at least one notch, the sleeve including a transmission unit which includes a driving column, a stop being formed to an inner side of the sleeve, the driving column of the sleeve being mounted to an outside of the spindle, one of the driving column and the spindle contacting an inner end of the inner tube, the spindle being connected to the shaft; and a lock ring mounted to the spindle and connected to the sleeve, the lock ring including a first recess and a second recess located corresponding to the lug of the spindle, and at least one tongue extending radially therefrom and protruding beyond the sleeve and located corresponding to the at least one notch, a second spring being located between the stop and the lock ring, wherein the driving part includes a driving ring which is connected to the driving column of the sleeve, wherein, when in a locked status, the spindle is rotated to locate the lug in the second recess, such that the lock ring compresses the second spring, and the at least one tongue is engaged with the at least one notch, and wherein, when in an unlock status, the spindle is rotated to locate the lug in the first recess, the second spring expands and axially biases the lock ring, such that the lug is engaged with the first recess and the at least one tongue is disengaged from the at least one notch.

11. The lock as claimed in claim 10, wherein the positioning portion and the at least one restriction portion are two correspondent planes, a notch and a protrusion, or a sliding block and a groove.

12. The lock as claimed in claim 10, wherein the at least one restriction unit and the positioning unit are two planes that are located corresponding to each other.

13. The lock as claimed in claim 10, wherein the inner tube includes two blocks which are radially mounted to an outer periphery of the connection portion.

14. The lock as claimed in claim 13, wherein the at least one restriction unit includes a hook formed to an inner periphery of each block, the positioning unit of the connection portion includes two axial grooves formed to the outer periphery of the connection portion, the two hooks of the two blocks are engaged with the two axial grooves.

15. The lock as claimed in claim 14, wherein the blocks each have a push part extending from the inner periphery thereof, the connection portion includes a hole formed to a distal end thereof, two passages are defined in the outer periphery of the connection portion and communicate with the hole, the two push parts extend through the two passages and reach the hole.

16. The lock as claimed in claim 13, wherein the at least one restriction unit includes at least one guide portion formed to each of the blocks, the positioning unit includes two slide units formed to the connection portion, the slide units are located corresponding to the at least one guide portion of each of the blocks, when the blocks move toward the first spring, the blocks move outward and radially relative to the slide units to form a path between the two blocks.

17. The lock as claimed in claim 16, wherein the at least one guide portion of each of the blocks and the slide units are correspondent channels and protrusions, each channel includes a straight channel and an inclined channel, the straight channel is defined axially in the connection portion, and the inclined channel extends outward and radially.

* * * * *